US012051167B2

(12) United States Patent
Powderly et al.

(10) Patent No.: US 12,051,167 B2
(45) Date of Patent: *Jul. 30, 2024

(54) INTERACTIONS WITH 3D VIRTUAL OBJECTS USING POSES AND MULTIPLE-DOF CONTROLLERS

(71) Applicant: Magic Leap, Inc., Plantation, FL (US)

(72) Inventors: James M. Powderly, Ft. Lauderdale, FL (US); Savannah Niles, Ft. Lauderdale, FL (US); Frank Alexander Hamilton, IV, Martinsburg, WV (US); Marshal Ainsworth Fontaine, St. Augustine, FL (US); Paul Armistead Hoover, Bothell, WA (US)

(73) Assignee: MAGIC LEAP, INC., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/298,983

(22) Filed: Apr. 11, 2023

(65) Prior Publication Data

US 2023/0245406 A1 Aug. 3, 2023

Related U.S. Application Data

(63) Continuation of application No. 17/361,059, filed on Jun. 28, 2021, now Pat. No. 11,657,579, which is a (Continued)

(51) Int. Cl.
G06F 3/0346 (2013.01)
G06F 3/01 (2006.01)
(Continued)

(52) U.S. Cl.
CPC ............ *G06T 19/006* (2013.01); *G06F 3/011* (2013.01); *G06F 3/0346* (2013.01); *G06F 1/163* (2013.01)

(58) Field of Classification Search
CPC ...... G06T 19/006; G06F 3/011; G06F 3/0346; G06F 1/163; G06F 3/017; G06F 3/04815
See application file for complete search history.

(56) References Cited

U.S. PATENT DOCUMENTS 5,590,268 A 12/1996 Doi et al.
5,952,993 A 9/1999 Matsuda et al.
(Continued)

FOREIGN PATENT DOCUMENTS

CN 103460256 A 12/2013
CN 105378625 A 3/2016
(Continued)

OTHER PUBLICATIONS

U.S. Appl. No. 14/641,376, filed Mar. 7, 2015, Bradski et al.
(Continued)

*Primary Examiner* — Jitesh Patel
(74) *Attorney, Agent, or Firm* — KLINTWORTH & ROZENBLAT IP LLP

(57) ABSTRACT

A wearable system can comprise a display system configured to present virtual content in a three-dimensional space, a user input device configured to receive a user input, and one or more sensors configured to detect a user's pose. The wearable system can support various user interactions with objects in the user's environment based on contextual information. As an example, the wearable system can adjust the size of an aperture of a virtual cone during a cone cast (e.g., with the user's poses) based on the contextual information. As another example, the wearable system can adjust the amount of movement of virtual objects associated with an actuation of the user input device based on the contextual information.

20 Claims, 24 Drawing Sheets

Related U.S. Application Data continuation of application No. 16/911,166, filed on Jun. 24, 2020, now Pat. No. 11,049,328, which is a continuation of application No. 16/682,851, filed on Nov. 13, 2019, now Pat. No. 10,733,806, which is a continuation of application No. 16/530,901, filed on Aug. 2, 2019, now Pat. No. 10,510,191, which is a continuation of application No. 16/053,620, filed on Aug. 2, 2018, now Pat. No. 10,417,831, which is a continuation of application No. 15/473,444, filed on Mar. 29, 2017, now Pat. No. 10,078,919.

(60) Provisional application No. 62/325,679, filed on Apr. 21, 2016, provisional application No. 62/316,030, filed on Mar. 31, 2016.

(51) Int. Cl.
*G06T 19/00* (2011.01)
*G06F 1/16* (2006.01)

(56) References Cited

U.S. PATENT DOCUMENTS

| | | | |
|---|---|---|---|
| 6,396,509 B1* | 5/2002 | Cheng | G06F 3/011 |
| | | | 715/848 |
| 6,532,007 B1 | 3/2003 | Matsuda | |
| 6,850,221 B1 | 2/2005 | Tickle | |
| D514,570 S | 2/2006 | Ohta | |
| 7,834,846 B1 | 11/2010 | Bell | |
| D658,094 S | 4/2012 | Dunn | |
| 8,458,603 B2 | 6/2013 | Finn et al. | |
| 8,466,931 B2 | 6/2013 | Finn et al. | |
| 8,950,867 B2 | 2/2015 | Macnamara | |
| 9,064,023 B2 | 6/2015 | Hyndman | |
| 9,081,426 B2 | 7/2015 | Armstrong | |
| 9,122,053 B2 | 9/2015 | Geisner et al. | |
| 9,176,579 B2 | 11/2015 | Hyndman et al. | |
| 9,202,313 B2 | 12/2015 | Bennet et al. | |
| 9,215,293 B2 | 12/2015 | Miller | |
| D752,529 S | 3/2016 | Loretan et al. | |
| 9,310,559 B2 | 4/2016 | Macnamara | |
| 9,348,143 B2 | 5/2016 | Gao et al. | |
| D758,367 S | 6/2016 | Natsume | |
| D759,657 S | 7/2016 | Kujawski et al. | |
| 9,417,452 B2 | 8/2016 | Schowengerdt et al. | |
| 9,470,906 B2 | 10/2016 | Kaji et al. | |
| 9,547,174 B2 | 1/2017 | Gao et al. | |
| 9,671,566 B2 | 6/2017 | Abovitz et al. | |
| D794,288 S | 8/2017 | Beers et al. | |
| 9,740,006 B2 | 8/2017 | Gao | |
| 9,791,700 B2 | 10/2017 | Schowengerdt et al. | |
| D805,734 S | 12/2017 | Fisher et al. | |
| 9,851,563 B2 | 12/2017 | Gao et al. | |
| 9,857,591 B2 | 1/2018 | Welch et al. | |
| 9,874,749 B2 | 1/2018 | Bradski | |
| 10,078,919 B2 | 9/2018 | Powderly et al. | |
| 10,417,831 B2 | 9/2019 | Powderly et al. | |
| 10,466,794 B2 | 11/2019 | Maeda et al. | |
| 10,510,191 B2 | 12/2019 | Powderly et al. | |
| 10,733,806 B2 | 8/2020 | Powderly et al. | |
| 10,838,484 B2 | 11/2020 | Naples et al. | |
| 11,049,328 B2 | 6/2021 | Powderly et al. | |
| 11,287,659 B2 | 3/2022 | Hoover et al. | |
| 11,340,694 B2 | 5/2022 | Naples et al. | |
| 2003/0169398 A1 | 9/2003 | Perrott et al. | |
| 2005/0275626 A1 | 12/2005 | Mueller et al. | |
| 2006/0007304 A1 | 1/2006 | Anderson | |
| 2006/0028436 A1 | 2/2006 | Armstrong | |
| 2006/0183546 A1 | 8/2006 | Addington et al. | |
| 2006/0197832 A1 | 9/2006 | Yamada et al. | |
| 2007/0081123 A1 | 4/2007 | Lewis | |
| 2007/0197287 A1 | 8/2007 | Shimizu | |
| 2009/0066725 A1 | 3/2009 | Nogami et al. | |
| 2009/0293012 A1* | 11/2009 | Alter | G06F 3/011 |
| | | | 715/848 |
| 2010/0020080 A1 | 1/2010 | Iwanaga | |
| 2010/0125799 A1 | 5/2010 | Roberts et al. | |
| 2010/0177117 A1 | 7/2010 | Finn et al. | |
| 2010/0240988 A1 | 9/2010 | Varga et al. | |
| 2010/0265182 A1 | 10/2010 | Ball et al. | |
| 2010/0325572 A1 | 12/2010 | Morris et al. | |
| 2011/0063286 A1 | 3/2011 | Roberts et al. | |
| 2011/0161060 A1 | 6/2011 | Kim et al. | |
| 2011/0191707 A1 | 8/2011 | Lee et al. | |
| 2012/0113092 A1 | 5/2012 | Bar-Zeev et al. | |
| 2012/0127062 A1 | 5/2012 | Bar-Zeev et al. | |
| 2012/0127284 A1 | 5/2012 | Bar-Zeev et al. | |
| 2012/0162549 A1 | 6/2012 | Gao et al. | |
| 2012/0249416 A1 | 10/2012 | Maciocci et al. | |
| 2012/0264510 A1 | 10/2012 | Wigdor et al. | |
| 2012/0320080 A1 | 12/2012 | Giese et al. | |
| 2013/0082922 A1 | 4/2013 | Miller | |
| 2013/0104085 A1 | 4/2013 | Mlyniec et al. | |
| 2013/0117377 A1* | 5/2013 | Miller | H04L 67/131 |
| | | | 709/205 |
| 2013/0125027 A1 | 5/2013 | Abovitz | |
| 2013/0208234 A1 | 8/2013 | Lewis | |
| 2013/0215230 A1 | 8/2013 | Miesnieks et al. | |
| 2013/0235029 A1 | 9/2013 | Keogh et al. | |
| 2013/0242262 A1 | 9/2013 | Lewis | |
| 2013/0285885 A1 | 10/2013 | Nowatzyk et al. | |
| 2014/0002351 A1 | 1/2014 | Nakayama | |
| 2014/0003762 A1 | 1/2014 | Macnamara | |
| 2014/0035959 A1 | 2/2014 | Lapstun | |
| 2014/0071539 A1 | 3/2014 | Gao | |
| 2014/0129990 A1 | 5/2014 | Xin et al. | |
| 2014/0152558 A1 | 6/2014 | Salter et al. | |
| 2014/0176607 A1 | 6/2014 | Yang et al. | |
| 2014/0177023 A1 | 6/2014 | Gao et al. | |
| 2014/0184588 A1 | 7/2014 | Cheng et al. | |
| 2014/0191872 A1 | 7/2014 | Gomi et al. | |
| 2014/0201674 A1 | 7/2014 | Holz | |
| 2014/0218468 A1 | 8/2014 | Gao et al. | |
| 2014/0240351 A1 | 8/2014 | Scavezze et al. | |
| 2014/0258942 A1 | 9/2014 | Kutliroff et al. | |
| 2014/0267420 A1 | 9/2014 | Schowengerdt | |
| 2014/0292653 A1 | 10/2014 | Kamba et al. | |
| 2014/0306866 A1 | 10/2014 | Miller et al. | |
| 2014/0320389 A1 | 10/2014 | Scavezze et al. | |
| 2014/0333666 A1 | 11/2014 | Poulos et al. | |
| 2014/0354532 A1 | 12/2014 | Bmullins | |
| 2014/0364212 A1 | 12/2014 | Osman et al. | |
| 2014/0375683 A1 | 12/2014 | Salter et al. | |
| 2015/0016777 A1 | 1/2015 | Abovitz et al. | |
| 2015/0061992 A1 | 3/2015 | Lamberty | |
| 2015/0062003 A1 | 3/2015 | Rafii et al. | |
| 2015/0062161 A1 | 3/2015 | Kim et al. | |
| 2015/0091941 A1 | 4/2015 | Das et al. | |
| 2015/0091943 A1 | 4/2015 | Lee et al. | |
| 2015/0103306 A1 | 4/2015 | Kaji et al. | |
| 2015/0116354 A1 | 4/2015 | Tomlin et al. | |
| 2015/0161762 A1 | 6/2015 | Fujiwara | |
| 2015/0168731 A1 | 6/2015 | Robbins | |
| 2015/0178939 A1 | 6/2015 | Bradski et al. | |
| 2015/0205126 A1 | 7/2015 | Schowengerdt | |
| 2015/0221115 A1 | 8/2015 | Matsubara | |
| 2015/0222883 A1 | 8/2015 | Welch | |
| 2015/0222884 A1 | 8/2015 | Cheng | |
| 2015/0227194 A1 | 8/2015 | Kubota et al. | |
| 2015/0243102 A1 | 8/2015 | Schowengerdt | |
| 2015/0262424 A1 | 9/2015 | Tabaka et al. | |
| 2015/0268415 A1 | 9/2015 | Schowengerdt et al. | |
| 2015/0302652 A1 | 10/2015 | Miller et al. | |
| 2015/0304645 A1 | 10/2015 | Wilson et al. | |
| 2015/0309263 A2 | 10/2015 | Abovitz et al. | |
| 2015/0326570 A1 | 11/2015 | Publicover et al. | |
| 2015/0341626 A1 | 11/2015 | Kim et al. | |
| 2015/0346490 A1 | 12/2015 | TeKolste et al. | |
| 2015/0346495 A1 | 12/2015 | Welch et al. | |
| 2015/0355805 A1 | 12/2015 | Chandler et al. | |
| 2015/0378440 A1 | 12/2015 | Umlauf et al. | |
| 2016/0011419 A1 | 1/2016 | Gao | |

(56) References Cited

U.S. PATENT DOCUMENTS

| | | |
|---|---|---|
| 2016/0026253 A1 | 1/2016 | Bradski et al. |
| 2016/0027217 A1 | 1/2016 | da Veiga et al. |
| 2016/0027218 A1 | 1/2016 | Salter et al. |
| 2016/0042566 A1 | 2/2016 | Mao |
| 2016/0050345 A1 | 2/2016 | Longbotham et al. |
| 2016/0055676 A1 | 2/2016 | Kasahara et al. |
| 2016/0129344 A1 | 5/2016 | Shiina et al. |
| 2016/0188181 A1 | 6/2016 | Smith |
| 2016/0210276 A1 | 7/2016 | Kawano et al. |
| 2016/0210784 A1 | 7/2016 | Ramsby et al. |
| 2016/0343138 A1 | 11/2016 | Chew |
| 2017/0169621 A1 | 6/2017 | Kawamoto et al. |
| 2017/0220225 A1 | 8/2017 | Joly et al. |
| 2017/0273436 A1 | 9/2017 | Caulier et al. |
| 2017/0287225 A1 | 10/2017 | Powderly et al. |
| 2017/0309079 A1 | 10/2017 | Naples et al. |
| 2018/0174366 A1 | 6/2018 | Nishibe et al. |
| 2018/0365901 A1 | 12/2018 | Powderly |
| 2020/0013236 A1 | 1/2020 | Perez et al. |
| 2020/0327737 A1 | 10/2020 | Powderly et al. |
| 2021/0011546 A1 | 1/2021 | Naples et al. |
| 2021/0286483 A1 | 9/2021 | Josephson |
| 2022/0020218 A1 | 1/2022 | Powderly |

FOREIGN PATENT DOCUMENTS

| | | |
|---|---|---|
| EP | 1 837 741 | 9/2007 |
| EP | 2767953 A1 | 8/2014 |
| EP | 3 015 954 | 5/2016 |
| EP | 3118722 A1 | 1/2017 |
| EP | 3665550 A1 | 6/2020 |
| GB | 2376397 | 12/2002 |
| JP | 04-372012 A | 12/1992 |
| JP | H0962864 A | 3/1997 |
| JP | H11264929 A | 9/1999 |
| JP | 11-288342 A | 10/1999 |
| JP | 2001-522498 A | 11/2001 |
| JP | 2002-170131 A | 6/2002 |
| JP | 2007222284 A | 9/2007 |
| JP | 2009151419 A | 7/2009 |
| JP | 2009187426 A | 8/2009 |
| JP | 2010-218195 A | 9/2010 |
| JP | 2009069918 A | 11/2010 |
| JP | 2011159273 A | 8/2011 |
| JP | 2012108842 A | 6/2012 |
| JP | 2012-155678 A | 8/2012 |
| JP | 2013054661 A | 3/2013 |
| JP | 2013-218597 A | 10/2013 |
| JP | 2014085954 A | 5/2014 |
| JP | 2014134922 A | 7/2014 |
| JP | 2014174747 A | 9/2014 |
| JP | 2014186361 A | 10/2014 |
| JP | JP WO 2015/059976 | 4/2015 |
| JP | 2015114757 A | 6/2015 |
| JP | 2015155959 A | 8/2015 |
| JP | 2015-536514 A | 12/2015 |
| JP | 2016507112 A | 3/2016 |
| JP | 2016508257 A | 3/2016 |
| JP | 5985116 B1 | 9/2016 |
| JP | 2017500673 A | 1/2017 |
| JP | JP WO 2014/208689 | 2/2017 |
| JP | JPWO2016013272 A1 | 4/2017 |
| JP | 2017-526030 A | 9/2017 |
| JP | 2018517967 A | 7/2018 |
| JP | 2023097014 A | 7/2023 |
| KR | 2001-0012091 | 2/2001 |
| KR | 20010012091 A | 2/2001 |
| KR | 2014-0093970 | 7/2014 |
| KR | 20140090683 A | 7/2014 |
| KR | 20150025115 A | 3/2015 |
| KR | 2015-0084485 | 7/2015 |
| KR | 2015-0092165 A | 8/2015 |
| KR | 20160023888 A | 3/2016 |
| WO | WO 2012/135546 | 10/2012 |
| WO | WO2013028813 A1 | 2/2013 |
| WO | WO 2014/085789 | 6/2014 |
| WO | WO 2014/204755 | 12/2014 |
| WO | WO2015051047 A1 | 4/2015 |
| WO | WO2015192117 A1 | 12/2015 |
| WO | WO2016031358 A1 | 3/2016 |
| WO | WO 2016/203792 | 12/2016 |
| WO | WO2017034667 A1 | 3/2017 |
| WO | WO 2017/172982 | 10/2017 |
| WO | WO2017184604 A1 | 10/2017 |
| WO | WO2019067902 A1 | 4/2019 |

OTHER PUBLICATIONS

U.S. Appl. No. 14/555,585, filed Nov. 27, 2014, Schowengerdt.
U.S. Appl. No. 14/690,401, filed Apr. 18, 2015, Miller et al.
U.S. Appl. No. 14/212,961, filed Mar. 4, 2014, Schowengerdt et al.
U.S. Appl. No. 14/331,218, filed Jul. 14, 2014, Abovitz et al.
U.S. Appl. No. 62/005,807, filed May 30, 2014, Klug et al.
U.S. Appl. No. 62/012,273, filed Jun. 14, 2014, Bradski.
European Extended Search Report, re EP Application No. 17776592.2, dated Oct. 30, 2019.
International Search Report and Written Opinion for PCT Application No. PCT/US2017/024844, mailed Jun. 22, 2017.
International Preliminary Report on Patentability for PCT Application No. PCT/US2017/024844, mailed Apr. 6, 2018.
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC-Chapel Hill, NC, Feb. 1995.
Bimber, et al., "Spatial Augmented Reality—Merging Real and Virtual Worlds," 2005 https://web.media.mit.edu/~raskar/book/BimberRaskarAugmentedRealityBook.pdf.
Bowman, D.A., et al.: "An Evaluation of Techniques for Grabbing and Manipulating Report Objects in Immersive Virtual Environments," Proceedings of 1997 Symposium on Interactive 3D Graphics Apr. 27-30, 1997, Providence, RI, USA.
Cashion, J., "Intelligent Selection Techniques for Virtual Environments", Dissertation, University of Central Florida, Dec. 2014, in 198 pages.
Debarba, H. et al., "Disambiguation Canvas: a precise selection technique for virtual environments", Conference: Interact 2013, Sep. 2013, in 18 pages.
Heidemann, G. et al., "Multimodal Interaction in an Augmented Reality Scenario", Proceedings of the 6th International Conference on Multimodal Interfaces, 2004, in 8 pages. URL: https://ni.www.techfak.uni-bielefeld.de/files/heidemann_ba_bekel_etal_ICMI04_reprint.pdf.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Kaiser, E. et al., "Mutual Disambiguation of 3D Multimodal Interaction in Augmented and Virtual Reality", Proceedings of the 5th International Conference on Multimodal Interfaces, 2003, in 9 pages. URL: http://www.academia.edu/download/307_44_360/p128-kaiser.pdf.
Melder, N. et al., "Translation and Rotation of Multi-Point Contacted Virtual Objects", Proceedings of the WorldHaptics Conference, 2003, in 10 pages.
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).
Wikipedia: "Cone Tracing," Wikipedia, accessed Nov. 1, 2015, in 3 pages. URL: https://en.wikipedia.org/wiki/Cone_tracing.

(56) References Cited

OTHER PUBLICATIONS

Wikipedia: "Ray casting", Wikipedia, accessed Nov. 1, 2015, in 4 pages. URL: https://en.wikipedia.org/wiki/Ray_casting.
Wikipedia: "Simultaneous localization and mapping", Wikipedia, accessed Oct. 22, 2015, in 7 pages. URL: https://en.wikipedia.org/wiki/Simultaneous_localization_and_mapping.
Wikipedia: "Volume ray casting", Wikipedia, accessed Nov. 1, 2015, in 4 pages. URL: https://en.wikipedia.org/wiki/Volume_ray_casting.
European Extended Search Report, re EP Application No. 17786528.4, dated Sep. 24, 2019.
International Search Report and Written Opinion for PCT Application No. PCT/US2017/028297, mailed Jun. 29, 2017.
International Preliminary Report on Patentability for PCT Application No. PCT/US2017/028297, issued Oct. 23, 2018.
Wikipedia: "Field of view", Wikipedia, retrieved Nov. 1, 2015, in 5 pages. URL: https://en.wikipedia.org/wiki/Field_of view.
Maimone, A. et al., "Computational Augmented Reality Eyeglasses", 2013 IEEE International Symposium on Mi ed and Augmented Reality, 2013, in 10 pages. URL: https://pdfs.semanticscholar.org/31cf/7b9bbc9199b0432483789ec65d81e64e4ddc.pdf.
Dana Slambekova et al: "Gaze and gesture based object manipulation in virtual worlds", Virtual Reality Software and Technology, ACM, 2 Penn Plaza, Suite 701 New York NY 10121-0701 USA, Dec. 10, 2012 (Dec. 10, 2012), pp. 203-204, XP058010169, DOI: 10.1145/2407336.2407380 ISBN: 978-1-4503-1469-5 * the whole document *.
Japanese Office Action issued in application No. 2023-97014 dated May 22, 2024.

* cited by examiner

INTERACTIONS WITH 3D VIRTUAL OBJECTS USING POSES AND MULTIPLE-DOF CONTROLLERS

CROSS-REFERENCE TO RELATED APPLICATIONS

This application is a continuation of U.S. patent application Ser. No. 17/361,059, filed Jun. 28, 2021, entitled "INTERACTIONS WITH 3D VIRTUAL OBJECTS USING POSES AND MULTIPLE-DOF CONTROLLERS," which is a continuation of U.S. patent application Ser. No. 16/911,166, filed Jun. 24, 2020, entitled "INTERACTIONS WITH 3D VIRTUAL OBJECTS USING POSES AND MULTIPLE-DOF CONTROLLERS," now U.S. Pat. No. 11,049,328, which is a continuation of U.S. patent application Ser. No. 16/682,851, filed Nov. 13, 2019, entitled "INTERACTIONS WITH 3D VIRTUAL OBJECTS USING POSES AND MULTIPLE-DOF CONTROLLERS," now U.S. Pat. No. 10,733,806, which is a continuation of U.S. patent application Ser. No. 16/530,901, filed Aug. 2, 2019, entitled "INTERACTIONS WITH 3D VIRTUAL OBJECTS USING POSES AND MULTIPLE-DOF CONTROLLERS," now U.S. Pat. No. 10,510,191, which is a continuation of U.S. patent application Ser. No. 16/053,620, filed Aug. 2, 2018, entitled "INTERACTIONS WITH 3D VIRTUAL OBJECTS USING POSES AND MULTIPLE-DOF CONTROLLERS," now U.S. Pat. No. 10,417,831, which is a continuation of U.S. patent application Ser. No. 15/473,444, filed Mar. 29, 2017, entitled "INTERACTIONS WITH 3D VIRTUAL OBJECTS USING POSES AND MULTIPLE-DOF CONTROLLERS," now U.S. Pat. No. 10,078,919, which claims the benefit of priority to U.S. Provisional Application No. 62/316,030, filed on Mar. 31, 2016, entitled "CONE CASTING WITH DYNAMICALLY UPDATED APERTURE," and to U.S. Provisional Application No. 62/325,679, filed on Apr. 21, 2016, entitled "DYNAMIC MAPPING OF USER INPUT DEVICE;" all of which are hereby incorporated by reference herein in their entireties.

FIELD

The present disclosure relates to virtual reality and augmented reality imaging and visualization systems and more particularly to interacting with virtual objects based on contextual information.

BACKGROUND

Modern computing and display technologies have facilitated the development of systems for so called "virtual reality", "augmented reality", or "mixed reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user; a mixed reality, or "MR", related to merging real and virtual worlds to produce new environments where physical and virtual objects co-exist and interact in real time. As it turns out, the human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR and MR technology.

SUMMARY OF THE INVENTION

In one embodiment, a system for interacting with objects for a wearable device is disclosed. The system comprises a display system of a wearable device configured to present a three-dimensional (3D) view to a user and permit a user interaction with objects in a field of regard (FOR) of a user. The FOR can comprise a portion of the environment around the user that is capable of being perceived by the user via the display system. The system can also comprise a sensor configured to acquire data associated with a pose of the user and a hardware processor in communication with the sensor and the display system. The hardware processor is programmed to: determine a pose of the user based on the data acquired by the sensor; initiate a cone cast on a group of objects in the FOR, the cone cast comprises casting a virtual cone with an aperture in a direction based at least partly on the pose of the user; analyze contextual information associated with the user's environment; update the aperture of the virtual cone based at least partly on the contextual information; and render a visual representation of the virtual cone for the cone cast.

In another embodiment, a method for interacting with objects for a wearable device is disclosed. The method comprises receiving a selection of a target virtual object displayed to a user at a first position in a three-dimensional (3D) space; receiving an indication of a movement for the target virtual object; analyzing contextual information associated with the target virtual object; calculating a multiplier to be applied to a movement of the target virtual object based at least partly on the contextual information; calculating a movement amount for the target virtual object, the movement amount based at least partly on the indication of the movement and the multiplier; and displaying, to the user, the target virtual object at a second position, the second position based at least in part on the first position and the movement amount.

In yet another embodiment, a system for interacting with objects for a wearable device is disclosed. The system comprises a display system of a wearable device configured to present a three-dimensional (3D) view of to a user, where the 3D view comprises a target virtual object. The system can also comprise a hardware processor in communication with the display system. The hardware processor is programmed to: receive an indication of a movement for the target virtual object; analyze contextual information associated with the target virtual object; calculate a multiplier to be applied to a movement of the target virtual object based at least partly on the contextual information; calculate a movement amount for the target virtual object, the movement amount based at least partly on the indication of the movement and the multiplier; and display, by the display system, the target virtual object at a second position, the second position based at least in part on the first position and the movement amount.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

Figure 1:
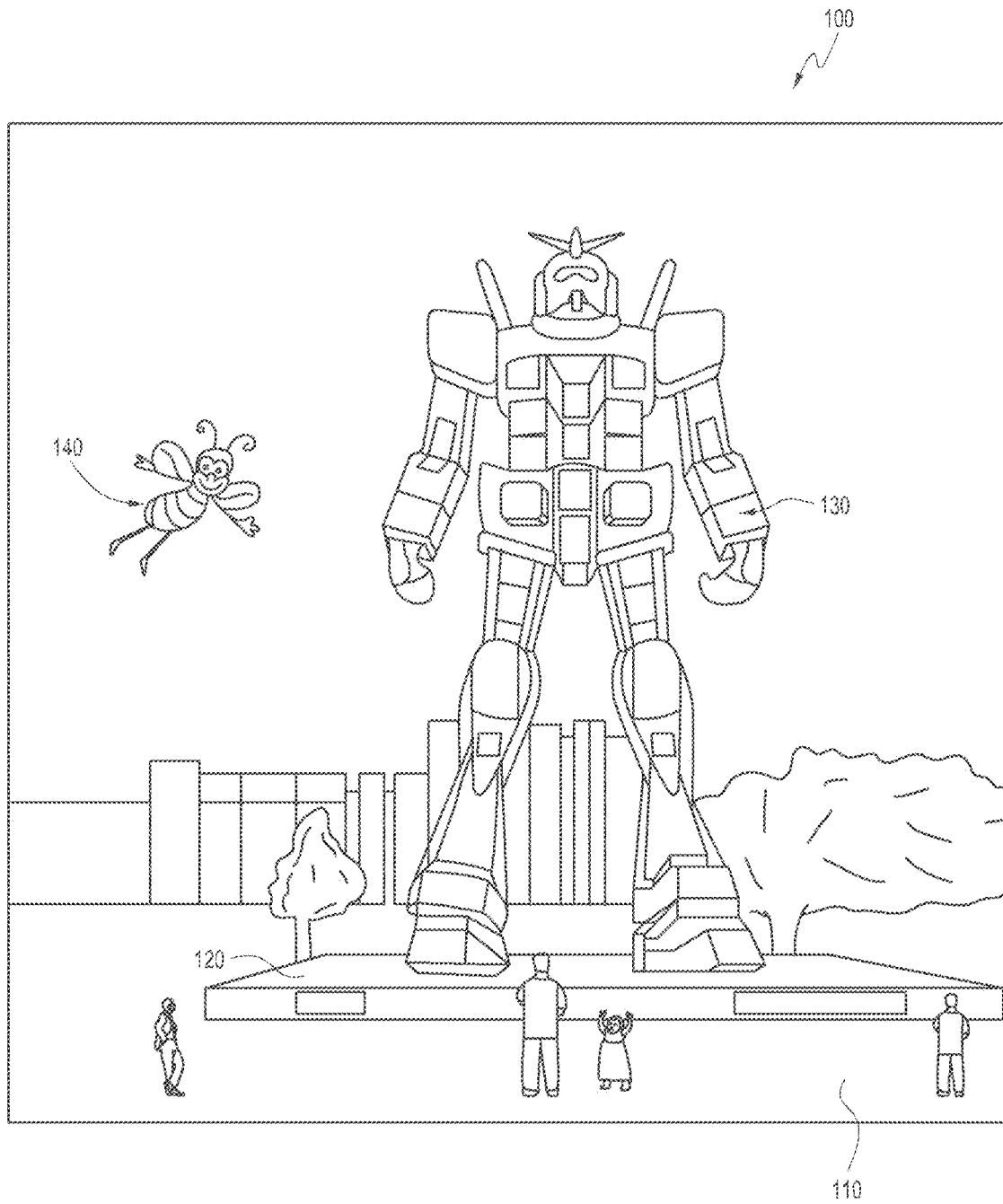
FIG. 1 depicts an illustration of a mixed reality scenario with certain virtual reality objects, and certain physical objects viewed by a person.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

A wearable system can be configured to display virtual content in an AR/VR/MR environment. The wearable system can allow a user to interact with physical or virtual objects in the user's environment. A user can interact with the objects, e.g., by selecting and moving objects, using poses or by actuating a user input device. For example, the user may move the user input device for a certain distance and the virtual object will follow the user input device and move the same amount of distance. Similarly, the wearable system may use cone casting to allow a user to select or target the virtual object with poses. As the user moves his head, the wearable system can accordingly target and select different virtual objects in the user's field of view.

These approaches can cause user fatigue if the objects are spaced relatively far apart. This is because in order to move the virtual object to the desired location or to reach a desired object, a user needs to move the user input device or increase the amount of body movements (e.g., increasing the amount of arm or head movement) for a large distance as well. Additionally, precise positioning for a distance object can be challenging because it may be difficult to see small amounts of adjustment at a far-away location. On the other hand, when objects are closer together, the user may prefer more precise positioning in order to accurately interact with a desired object.

To reduce user fatigue and provide dynamic user interactions with the wearable system, the wearable system can automatically adjust the user interface operations based on contextual information.

As an example of providing dynamic user interactions based on contextual information, the wearable system can automatically update the aperture of the cone in cone casting based on contextual factors. For example, if the user turns her head toward a direction with a high density of objects, the wearable system may automatically decrease the cone aperture so that there are fewer virtual, selectable objects within the cone. Similarly, if the user turns her head to a direction with a low density of objects, the wearable system may automatically increase the cone aperture to either include more objects within the cone or to decrease the amount of movement necessary in order to overlap the cone with a virtual object.

As another example, the wearable system can provide a multiplier which can translate the amount of movement of the user input device (and/or the movements of the user) to a greater amount of movement of the virtual object. As a result, the user does not have to physically move a large distance to move the virtual object to a desired location when the object is located far away. However, the multiplier may be set to one when the virtual object is close to the user (e.g., within the user's hand reach). Accordingly, the wearable system can provide one-to-one manipulation between the user movement and the virtual object's movement. This may allow the user to interact with the nearby virtual object with increased precision. Examples of user interactions based on contextual information are described in details below.

Examples of 3D Display of a Wearable System

A wearable system (also referred to herein as an augmented reality (AR) system) can be configured to present 2D or 3D virtual images to a user. The images may be still images, frames of a video, or a video, in combination or the like. The wearable system can include a wearable device that can present a VR, AR, or MR environment, alone or in combination, for user interaction. The wearable device can be a head-mounted device (HMD).

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
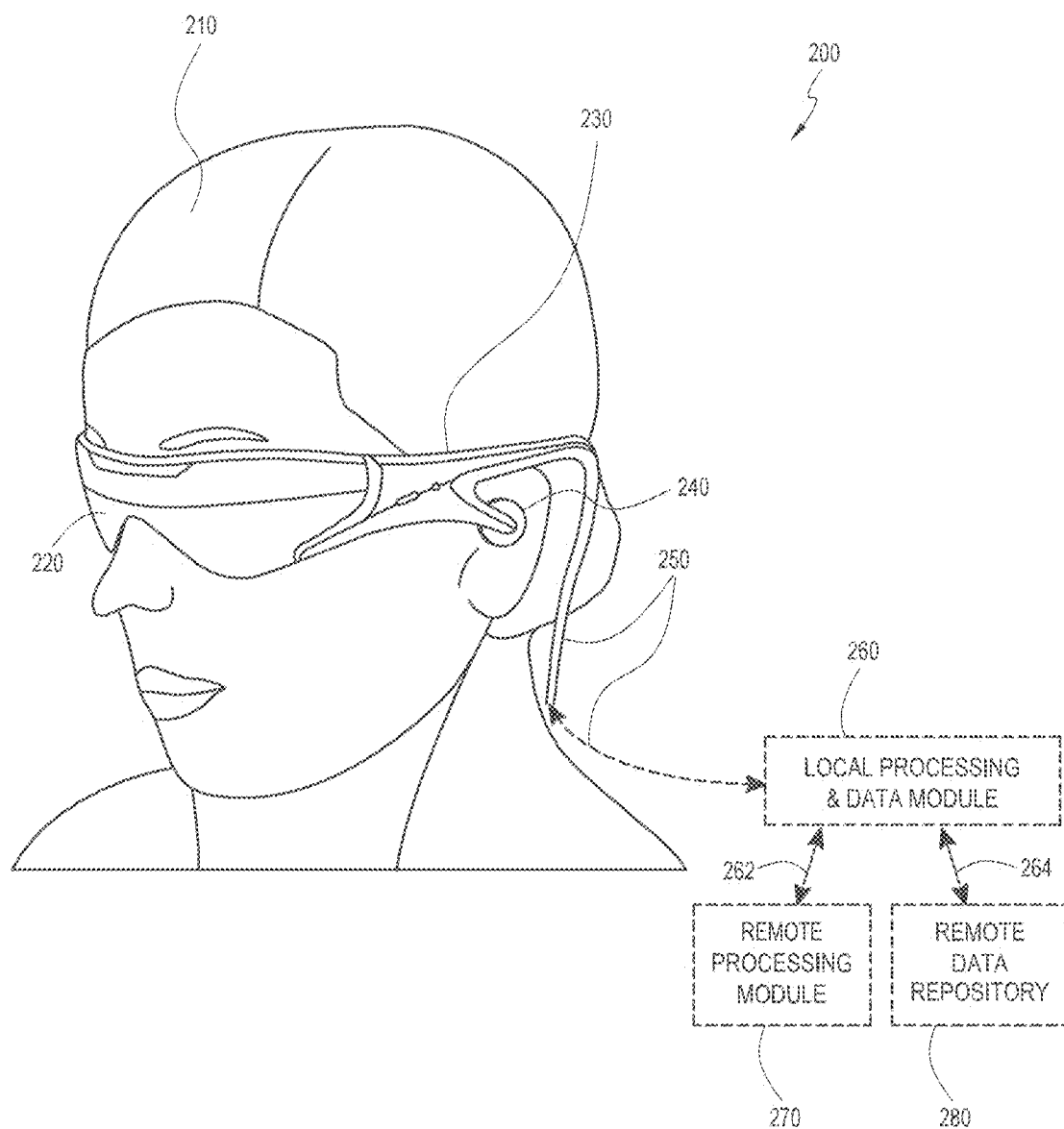
FIG. 2 schematically illustrates an example of a wearable system.

FIG. 2 illustrates an example of wearable system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display (HMD) that is worn on the head of the user. In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control).

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210.

As an example, the wearable system 200 can use the outward-facing imaging system 464 or the inward-facing imaging system 462 to acquire images of a pose of the user. The images may be still images, frames of a video, or a video, in combination or the like.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), microphones, inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 280 and remote data repository 280 may be operatively coupled to each other.

In some embodiments, the remote processing module 270 may comprise one or more processors configured to analyze and process data and/or image information. In some embodiments, the remote data repository 280 may comprise a digital data storage facility, which may be available through the internet or other networking configuration in a "cloud" resource configuration. In some embodiments, all data is stored and all computations are performed in the local processing and data module, allowing fully autonomous use from a remote module.

The human visual system is complicated and providing a realistic perception of depth is challenging. Without being limited by theory, it is believed that viewers of an object may perceive the object as being three-dimensional due to a combination of vergence and accommodation. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Figure 3:
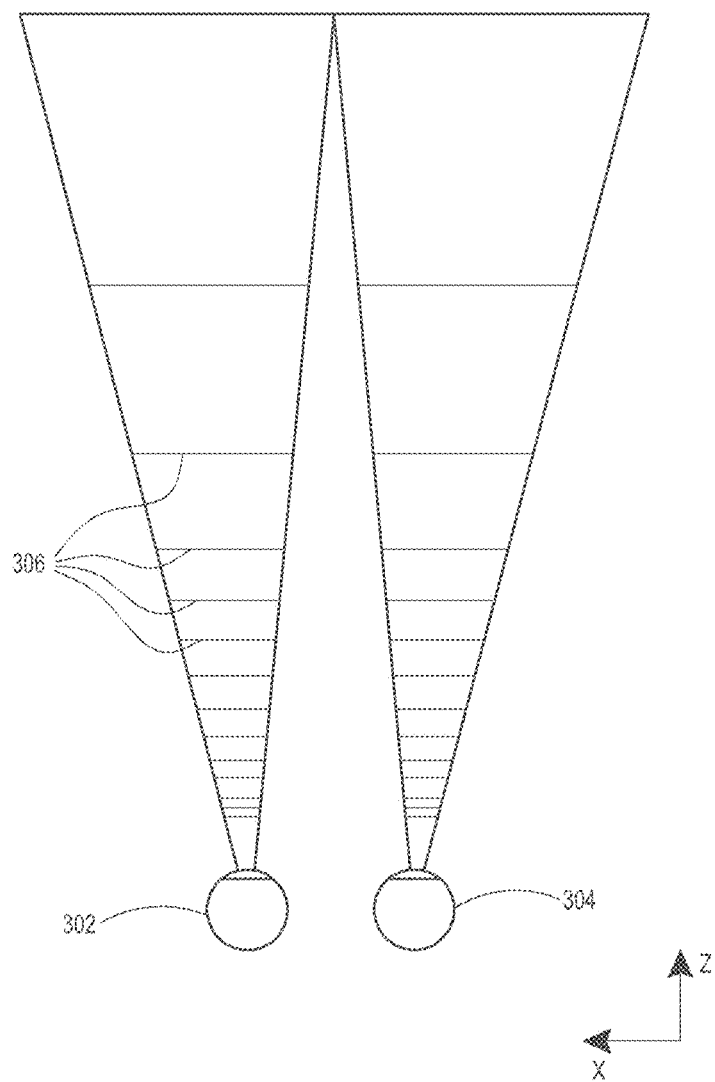
FIG. 3 schematically illustrates aspects of an approach for simulating three-dimensional imagery using multiple depth planes.

FIG. 3 illustrates aspects of an approach for simulating a three-dimensional imagery using multiple depth planes. With reference to FIG. 3, objects at various distances from eyes 302 and 304 on the z-axis are accommodated by the eyes 302 and 304 so that those objects are in focus. The eyes 302 and 304 assume particular accommodated states to bring into focus objects at different distances along the z-axis. Consequently, a particular accommodated state may be said to be associated with a particular one of depth planes 306, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 302 and 304, and also by providing different presentations of the image corresponding to each of the depth planes. While shown as being separate for clarity of illustration, it will be appreciated that the fields of view of the eyes 302 and 304 may overlap, for example, as distance along the z-axis increases. In addition, while shown as flat for the ease of illustration, it will be appreciated that the contours of a depth plane may be curved in physical space, such that all features in a depth plane are in focus with the eye in a particular accommodated state. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

Waveguide Stack Assembly

Figure 4:
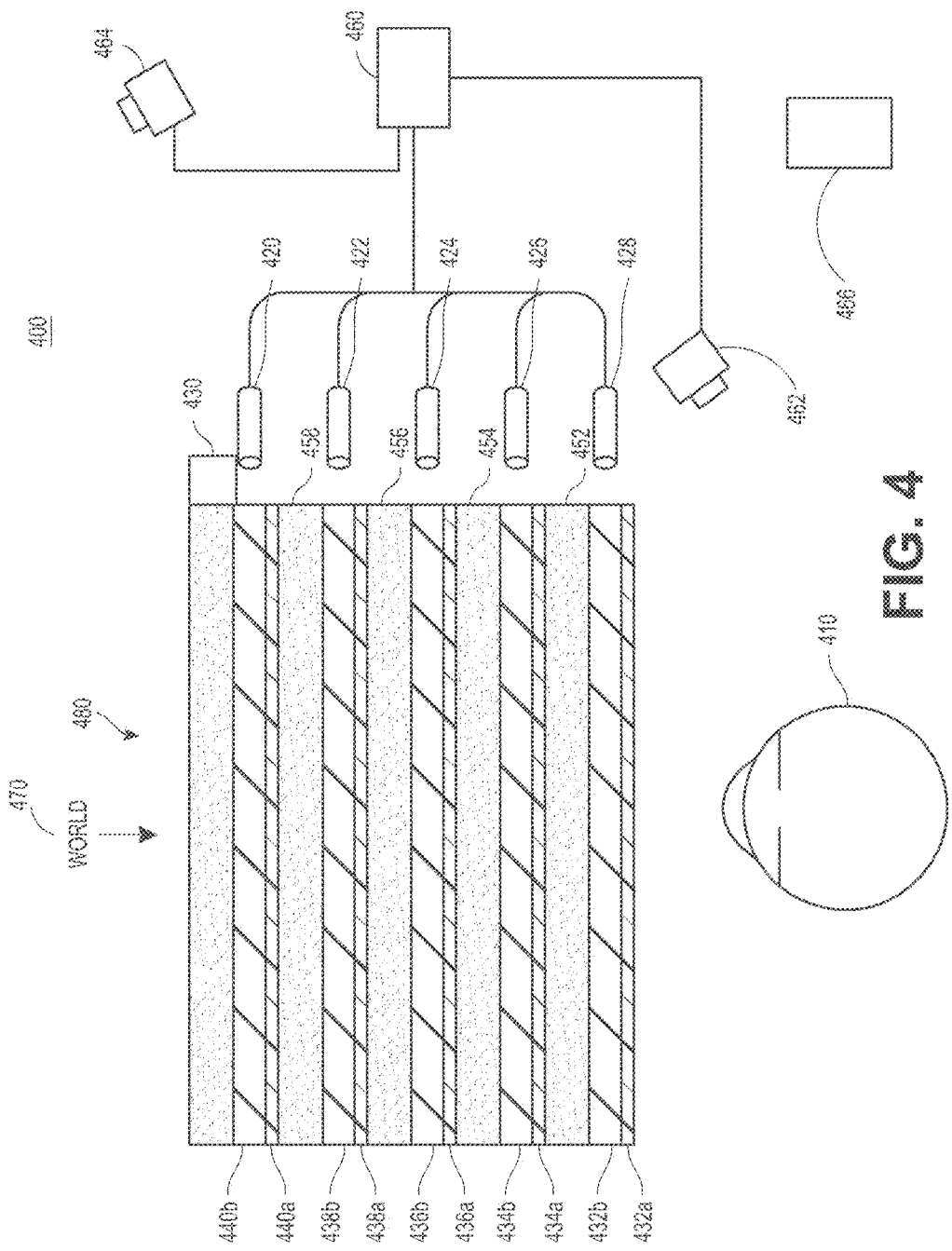
FIG. 4 schematically illustrates an example of a waveguide stack for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432b, 434b, 436b, 438b, 4400b. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 432b, 434b, 436b, 438b, 440b or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440b, 438b, 436b, 434b, 432b, each of which may be configured to distribute incoming light across each respective waveguide, for output toward the eye 410. Light exits an output surface of the image injection devices 420, 422, 424, 426, 428 and is injected into a corresponding input edge of the waveguides 440b, 438b, 436b, 434b, 432b. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440b, 438b, 436b, 434b, 432b, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440b, 438b, 436b, 434b, 432b. In some embodiments, the controller 460 may be a single integral device, or a distributed system connected by wired or wireless communication channels. The controller 460 may be part of the processing modules 260 or 270 (illustrated in FIG. 2) in some embodiments.

The waveguides 440b, 438b, 436b, 434b, 432b may be configured to propagate light within each respective waveguide by total internal reflection (TIR). The waveguides 440b, 438b, 436b, 434b, 432b may each be planar or have another shape (e.g., curved), with major top and bottom surfaces and edges extending between those major top and bottom surfaces. In the illustrated configuration, the waveguides 440b, 438b, 436b, 434b, 432b may each include light extracting optical elements 440a, 438a, 436a, 434a, 432a that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440a, 438a, 436a, 434a, 432a) may, for example, be reflective or diffractive optical features. While illustrated disposed at the bottom major surfaces of the waveguides 440b, 438b, 436b, 434b, 432b for ease of description and drawing clarity, in some embodiments, the light extracting optical elements 440a, 438a, 436a, 434a, 432a may be disposed at the top or bottom major surfaces, or may be disposed directly in the volume of the waveguides 440b, 438b, 436b, 434b, 432b. In some embodiments, the light extracting optical elements 440a, 438a, 436a, 434a, 432a may be formed in a layer of material that is attached to a transparent substrate to form the waveguides 440b, 438b, 436b, 434b, 432b. In some other embodiments, the waveguides 440b, 438b, 436b, 434b, 432b may be a monolithic piece of material and the light extracting optical elements 440a, 438a, 436a, 434a, 432a may be formed on a surface or in the interior of that piece of material.

With continued reference to FIG. 4, as discussed herein, each waveguide 440b, 438b, 436b, 434b, 432b is configured to output light to form an image corresponding to a particular depth plane. For example, the waveguide 432b nearest the eye may be configured to deliver collimated light, as injected into such waveguide 432b, to the eye 410. The collimated light may be representative of the optical infinity focal plane. The next waveguide up 434b may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434b as coming from a first focal plane closer inward toward the eye 410 from optical infinity. Similarly, the third up waveguide 436b passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436b as coming from a second focal plane that is even closer inward toward the person from optical infinity than was light from the next waveguide up 434b.

The other waveguide layers (e.g., waveguides 438b, 440b) and lenses (e.g., lenses 456, 458) are similarly configured, with the highest waveguide 440b in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440a, 438a, 436a, 434a, 432a may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440a, 438a, 436a, 434a, 432a are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 may be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) and the imaging system 464 is sometimes referred to as an FOV camera. The entire region available for viewing or imaging by a viewer may be referred to as the field of regard (FOR). The FOR may include $4\pi$ steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size and/or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) is determined and assumed to be similar for both eyes of the user. The images obtained by the inward-facing imaging system 466 may be analyzed to determine the user's eye pose or mood, which can be used by the wearable system 400 to decide which audio or visual content should be presented to the user. The wearable system 400 may also determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Figure 5:
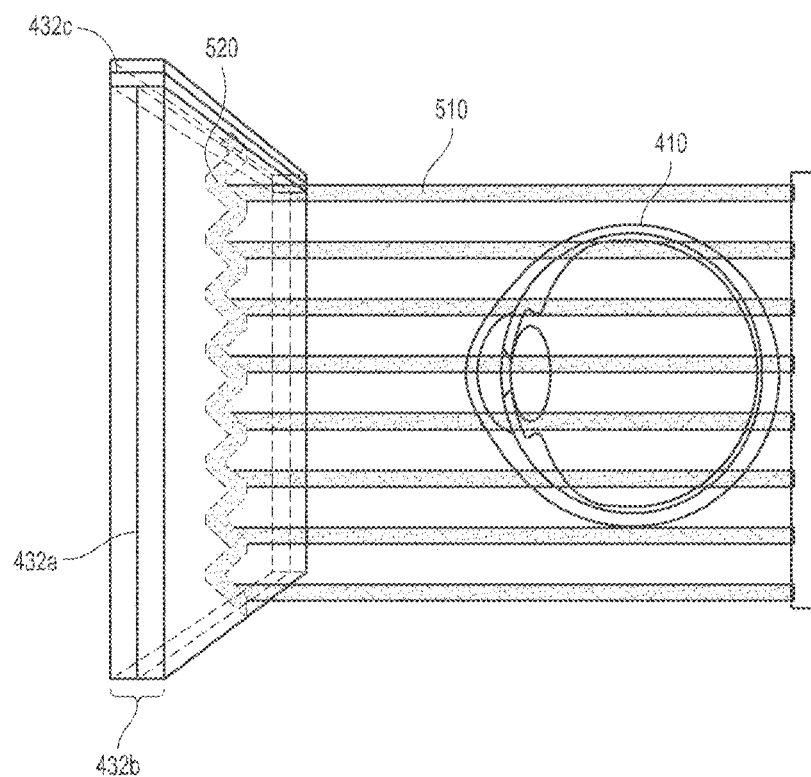
FIG. 5 shows example exit beams that may be outputted by a waveguide.

FIG. 5 shows an example of exit beams outputted by a waveguide. One waveguide is illustrated, but it will be appreciated that other waveguides in the waveguide assembly 480 may function similarly, where the waveguide assembly 480 includes multiple waveguides. Light 520 is injected into the waveguide 432b at the input edge 432c of the waveguide 432b and propagates within the waveguide 432b by TIR. At points where the light 520 impinges on the DOE 432a, a portion of the light exits the waveguide as exit beams 510. The exit beams 510 are illustrated as substantially parallel but they may also be redirected to propagate to the eye 410 at an angle (e.g., forming divergent exit beams), depending on the depth plane associated with the waveguide 432b. It will be appreciated that substantially parallel exit beams may be indicative of a waveguide with light extracting optical elements that outcouple light to form images that appear to be set on a depth plane at a large distance (e.g., optical infinity) from the eye 410. Other waveguides or other sets of light extracting optical elements may output an exit beam pattern that is more divergent, which would require the eye 410 to accommodate to a closer distance to bring it into focus on the retina and would be interpreted by the brain as light from a distance closer to the eye 410 than optical infinity.

Figure 6:
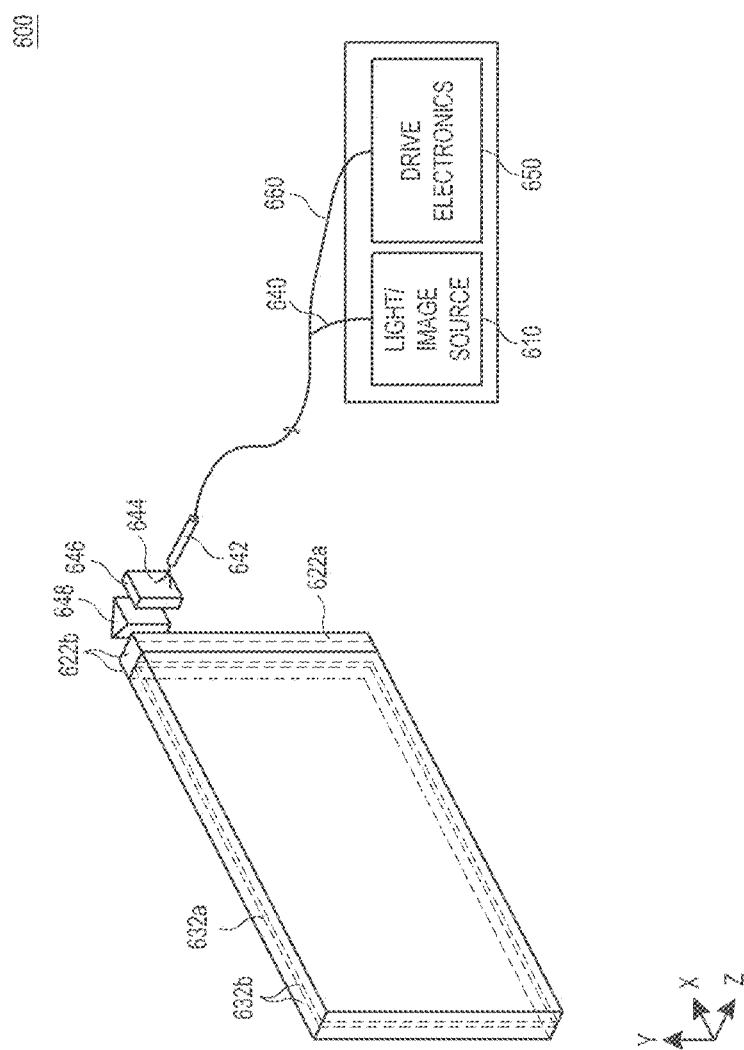
FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field.

FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field. The optical system can include a waveguide apparatus, an optical coupler subsystem to optically couple light to or from the waveguide apparatus, and a control subsystem. The optical system can be used to generate a multi-focal volumetric, image, or light field. The optical system can include one or more primary planar waveguides 632a (only one is shown in FIG. 6) and one or more DOEs 632b associated with each of at least some of the primary waveguides 632a. The planar waveguides 632b can be similar to the waveguides 432b, 434b, 436b, 438b, 440b discussed with reference to FIG. 4. The optical system may employ a distribution waveguide apparatus to relay light along a first axis (vertical or Y-axis in view of FIG. 6), and expand the light's effective exit pupil along the first axis (e.g., Y-axis). The distribution waveguide apparatus may, for example, include a distribution planar waveguide 622b and at least one DOE 622a (illustrated by double dash-dot line) associated with the distribution planar waveguide 622b. The distribution planar waveguide 622b may be similar or identical in at least some respects to the primary planar waveguide 632b, having a different orientation therefrom. Likewise, at least one DOE 622a may be similar or identical in at least some respects to the DOE 632a. For example, the distribution planar waveguide 622b or DOE 622a may be comprised of the same materials as the primary planar waveguide 632b or DOE 632a, respectively. Embodiments of the optical display system 600 shown in FIG. 6 can be integrated into the wearable system 200 shown in FIG. 2.

The relayed and exit-pupil expanded light may be optically coupled from the distribution waveguide apparatus into the one or more primary planar waveguides 632b. The primary planar waveguide 632b can relay light along a second axis, preferably orthogonal to first axis (e.g., horizontal or X-axis in view of FIG. 6). Notably, the second axis can be a non-orthogonal axis to the first axis. The primary planar waveguide 632b expands the light's effective exit pupil along that second axis (e.g., X-axis). For example, the distribution planar waveguide 622b can relay and expand light along the vertical or Y-axis, and pass that light to the primary planar waveguide 632b which can relay and expand light along the horizontal or X-axis.

The optical system may include one or more sources of colored light (e.g., red, green, and blue laser light) 610 which may be optically coupled into a proximal end of a single mode optical fiber 640. A distal end of the optical fiber 640 may be threaded or received through a hollow tube 642 of piezoelectric material. The distal end protrudes from the tube 642 as fixed-free flexible cantilever 644. The piezoelectric tube 642 can be associated with four quadrant electrodes (not illustrated). The electrodes may, for example, be plated on the outside, outer surface or outer periphery or diameter of the tube 642. A core electrode (not illustrated) may also be located in a core, center, inner periphery or inner diameter of the tube 642.

Drive electronics 650, for example electrically coupled via wires 660, drive opposing pairs of electrodes to bend the piezoelectric tube 642 in two axes independently. The protruding distal tip of the optical fiber 644 has mechanical modes of resonance. The frequencies of resonance can depend upon a diameter, length, and material properties of the optical fiber 644. By vibrating the piezoelectric tube 642 near a first mode of mechanical resonance of the fiber cantilever 644, the fiber cantilever 644 can be caused to vibrate, and can sweep through large deflections.

By stimulating resonant vibration in two axes, the tip of the fiber cantilever 644 is scanned biaxially in an area filling two-dimensional (2D) scan. By modulating an intensity of light source(s) 610 in synchrony with the scan of the fiber cantilever 644, light emerging from the fiber cantilever 644 can form an image. Descriptions of such a set up are provided in U.S. Patent Publication No. 2014/0003762, which is incorporated by reference herein in its entirety.

A component of an optical coupler subsystem can collimate the light emerging from the scanning fiber cantilever 644. The collimated light can be reflected by mirrored surface 648 into the narrow distribution planar waveguide 622b which contains the at least one diffractive optical element (DOE) 622a. The collimated light can propagate vertically (relative to the view of FIG. 6) along the distribution planar waveguide 622b by TIR, and in doing so repeatedly intersects with the DOE 622a. The DOE 622a preferably has a low diffraction efficiency. This can cause a fraction (e.g., 10%) of the light to be diffracted toward an edge of the larger primary planar waveguide 632b at each point of intersection with the DOE 622a, and a fraction of the light to continue on its original trajectory down the length of the distribution planar waveguide 622b via TIR.

At each point of intersection with the DOE 622a, additional light can be diffracted toward the entrance of the primary waveguide 632b. By dividing the incoming light into multiple outcoupled sets, the exit pupil of the light can be expanded vertically by the DOE 4 in the distribution planar waveguide 622b. This vertically expanded light coupled out of distribution planar waveguide 622b can enter the edge of the primary planar waveguide 632b.

Light entering primary waveguide 632b can propagate horizontally (relative to the view of FIG. 6) along the primary waveguide 632b via TIR. As the light intersects with DOE 632a at multiple points as it propagates horizontally along at least a portion of the length of the primary waveguide 632b via TIR. The DOE 632a may advantageously be designed or configured to have a phase profile that is a summation of a linear diffraction pattern and a radially symmetric diffractive pattern, to produce both deflection and focusing of the light. The DOE 632a may advantageously have a low diffraction efficiency (e.g., 10%), so that only a portion of the light of the beam is deflected toward the eye of the view with each intersection of the DOE 632a while the rest of the light continues to propagate through the primary waveguide 632b via TIR.

At each point of intersection between the propagating light and the DOE 632a, a fraction of the light is diffracted toward the adjacent face of the primary waveguide 632b allowing the light to escape the TIR, and emerge from the face of the primary waveguide 632b. In some embodiments, the radially symmetric diffraction pattern of the DOE 632a additionally imparts a focus level to the diffracted light, both shaping the light wavefront (e.g., imparting a curvature) of the individual beam as well as steering the beam at an angle that matches the designed focus level.

Accordingly, these different pathways can cause the light to be coupled out of the primary planar waveguide 632b by a multiplicity of DOEs 632a at different angles, focus levels, and/or yielding different fill patterns at the exit pupil. Different fill patterns at the exit pupil can be beneficially used to create a light field display with multiple depth planes. Each layer in the waveguide assembly or a set of layers (e.g., 3 layers) in the stack may be employed to generate a respective color (e.g., red, blue, green). Thus, for example, a first set of three adjacent layers may be employed to respectively produce red, blue and green light at a first focal depth. A second set of three adjacent layers may be employed to respectively produce red, blue and green light at a second focal depth. Multiple sets may be employed to generate a full 3D or 4D color image light field with various focal depths.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

Example Wearable Systems, Environments, and Interfaces

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 7:
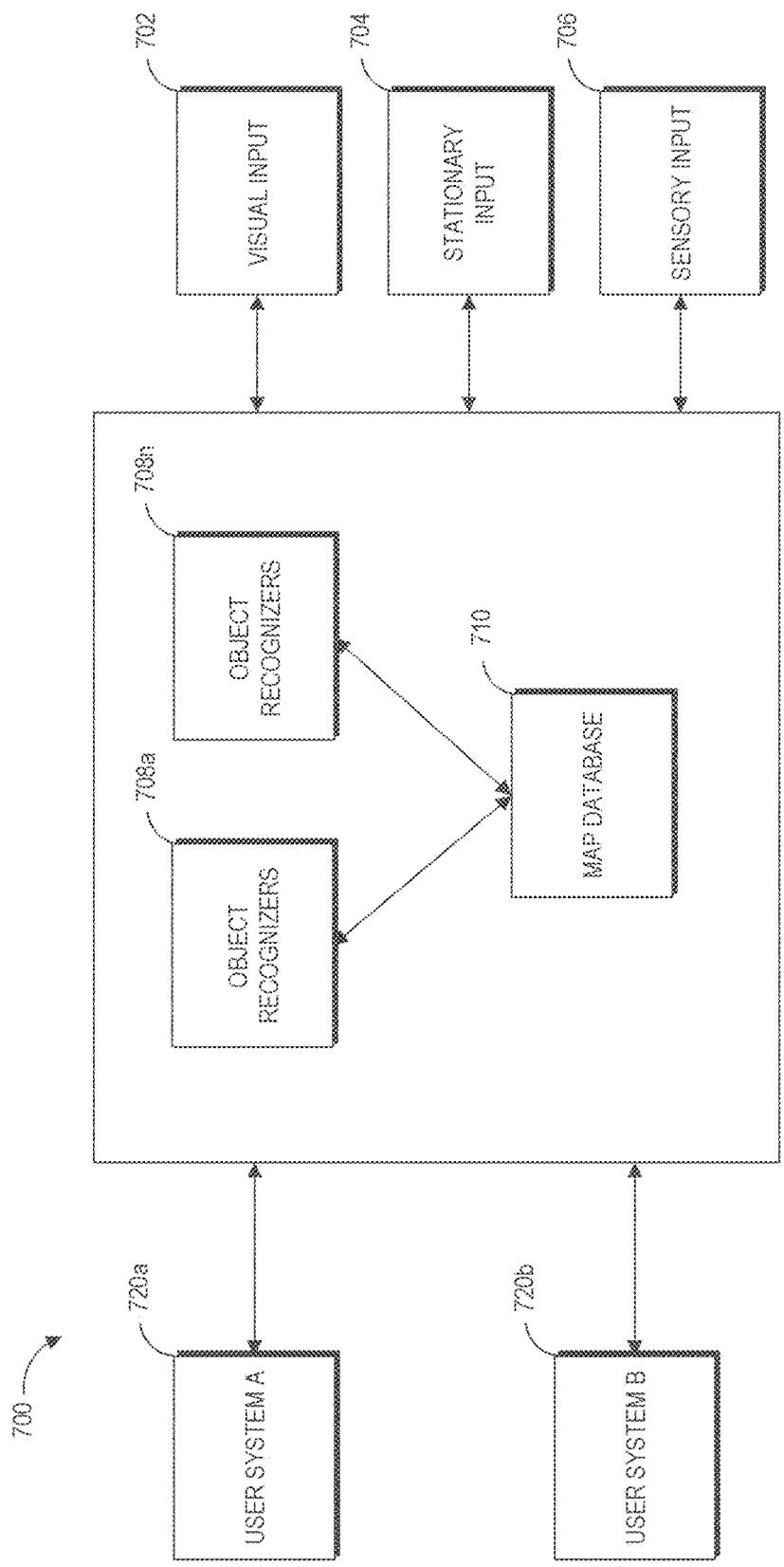
FIG. 7 is a block diagram of an example of a wearable system.

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 466 etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects in an environment. For example, the object recognizers can recognize faces, persons, windows, walls, user input devices, televisions, other objects in the user's environment, etc. One or more object recognizers may be specialized for object with certain characteristics. For example, the object recognizer 708a may be used to recognizer faces, while another object recognizer may be used recognize totems.

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition, object pose estimation, learning, indexing, motion estimation, or image restoration, etc. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable HMD can be configured to utilize a plurality of techniques to generate models for analysis of the aggregated data. Other techniques may include using pre-defined thresholds or data values.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
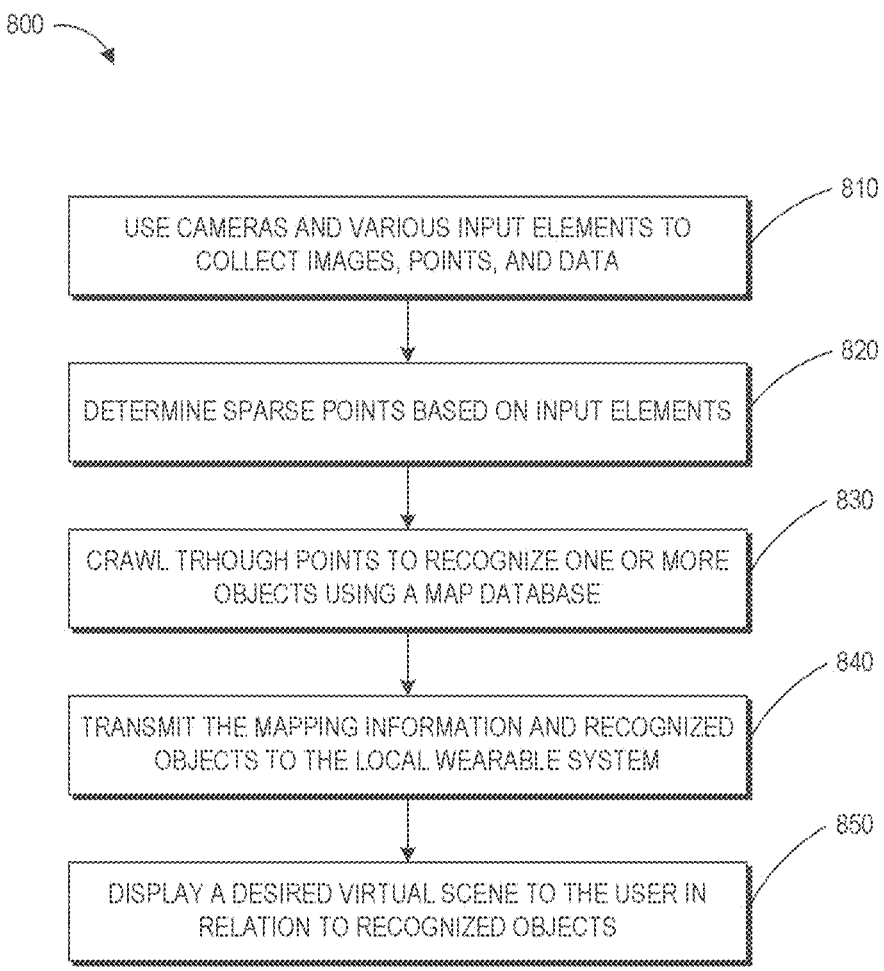
FIG. 8 is a process flow diagram of an example of a method of rendering virtual content in relation to recognized objects.

FIG. 8 is a process flow diagram of an example of a method 800 of rendering virtual content in relation to recognized objects. The method 800 describes how a virtual scene may be represented to a user of the wearable system. The user may be geographically remote from the scene. For example, the user may be New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708a-708n may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Figure 9:
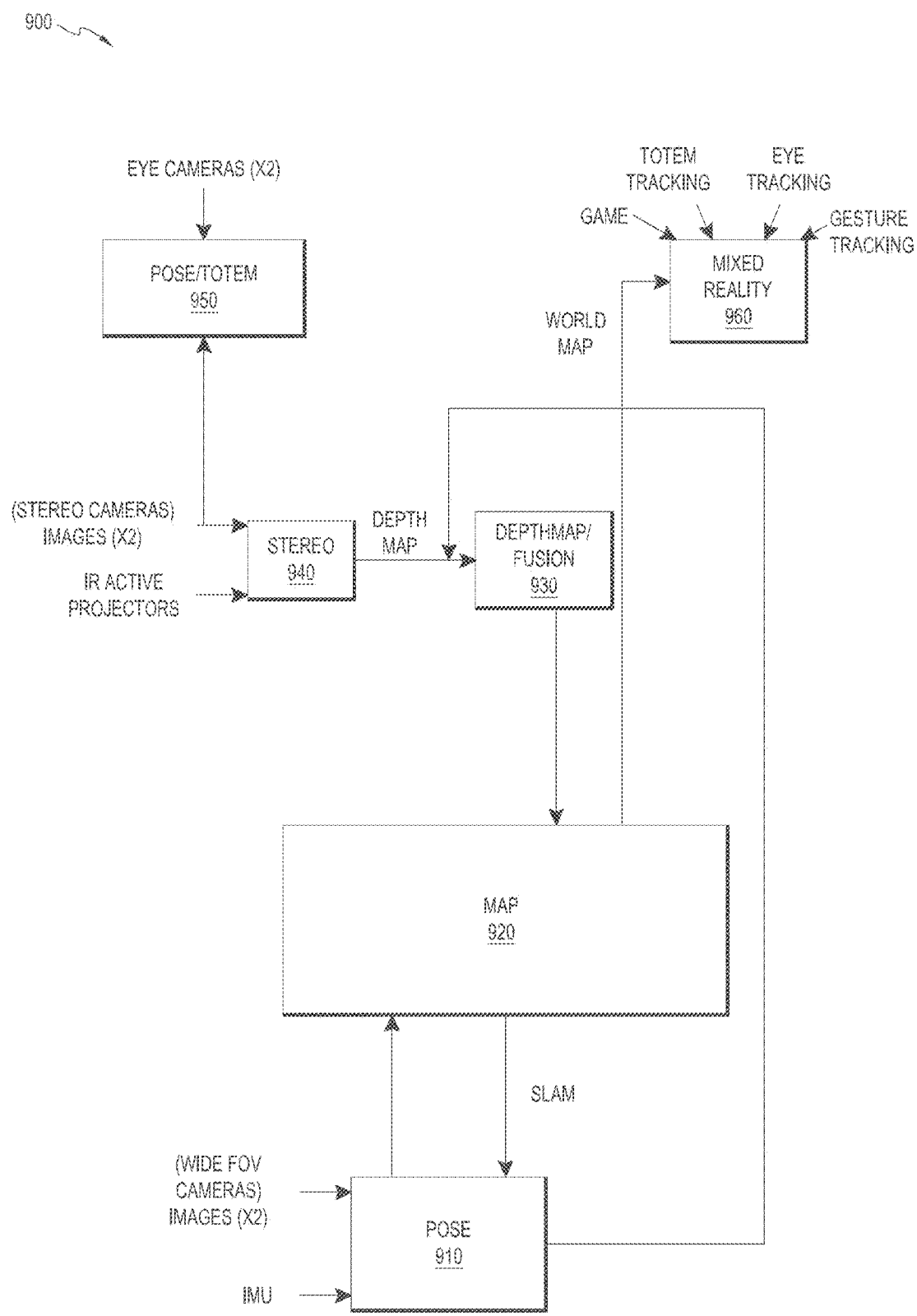
FIG. 9 is a block diagram of another example of a wearable system.

FIG. 9 is a block diagram of another example of a wearable system. In this example, the wearable system 900 comprises a map, which may include map data for the world. The map may partly reside locally on the wearable system, and may partly reside at networked storage locations accessible by wired or wireless network (e.g., in a cloud system). A pose process 910 may be executed on the wearable computing architecture (e.g., processing module 260 or controller 460) and utilize data from the map to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (SLAM or V-SLAM, referring to a configuration wherein the input is images/visual only) process. The system can be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 940, wherein depth information is determined using a technique such as triangulation or time-of-flight sensing. Image information and active patterns (such as infrared patterns created using active projectors) may serve as input to the Stereo process 940. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 940 may be combined in the fusion process 930. Pose may be an input to this fusion process 930 as well, and the output of fusion 930 becomes an input to populating the map process 920. Sub-surfaces may connect with each other, such as in topographical mapping, to form larger surfaces, and the map becomes a large hybrid of points and surfaces.

To resolve various aspects in a mixed reality process 960, various inputs may be utilized. For example, in the embodiment depicted in FIG. 9, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding where such objects are relative to each other, to be another valuable input to mixed reality. Pose relative to the world becomes an input as well and plays a key role to almost any interactive system.

Controls or inputs from the user are another input to the wearable system 900. As described herein, user inputs can include visual input, gestures, totems, audio input, sensory input, etc. In order to move around or play a game, for example, the user may need to instruct the wearable system 900 regarding what he or she wants to do. Beyond just moving oneself in space, there are various forms of user controls that may be utilized. In one embodiment, a totem (e.g. a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 900 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 900 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined.

With regard to the camera systems, the example wearable system 900 shown in FIG. 9 can include three pairs of cameras: a relative wide FOV or passive SLAM pair of cameras arranged to the sides of the user's face, a different pair of cameras oriented in front of the user to handle the stereo imaging process 940 and also to capture hand gestures and totem/object tracking in front of the user's face. The FOV cameras and the pair of cameras for the stereo process 940 may be a part of the outward-facing imaging system 464 (shown in FIG. 4). The wearable system 900 can include eye tracking cameras (which may be a part of an inward-facing imaging system 462 shown in FIG. 4) oriented toward the eyes of the user in order to triangulate eye vectors and other information. The wearable system 900 may also comprise one or more textured light projectors (such as infrared (IR) projectors) to inject texture into a scene.

Figure 10:
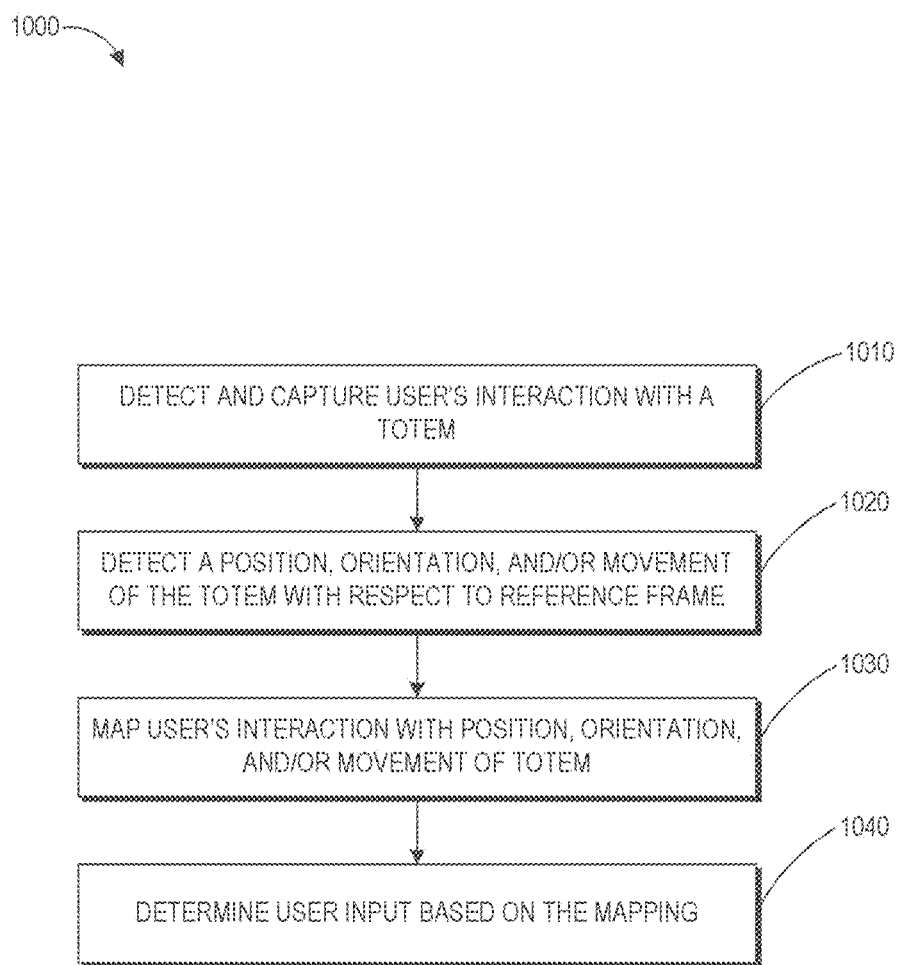
FIG. 10 is a process flow diagram of an example of a method for determining user input to a wearable system.

FIG. 10 is a process flow diagram of an example of a method 1000 for determining user input to a wearable system. In this example, the user may interact with a totem. The user may have multiple totems. For example, the user may have designated one totem for a social media application, another totem for playing games, etc. At block 1010, the wearable system may detect a motion of a totem. The movement of the totem may be recognized through the outward facing system or may be detected through sensors (e.g., haptic glove, image sensors, hand tracking devices, eye-tracking cameras, head as, etc.).

Based at least partly on the detected gesture, eye pose, head pose, or input through the totem, the wearable system detects a position, orientation, and/or movement of the totem (or the user's eyes or head or gestures) with respect to a reference frame, at block 1020. The reference frame may be a set of map points based on which the wearable system translates the movement of the totem (or the user) to an action or command. At block 1030, the user's interaction with the totem is mapped. Based on the mapping of the user interaction with respect to the reference frame 1020, the system determines the user input at block 1040.

For example, the user may move a totem or physical object back and forth to signify turning a virtual page and moving on to a next page or moving from one user interface (UI) display screen to another UI screen. As another example, the user may move their head or eyes to look at different real or virtual objects in the user's FOR. If the user's gaze at a particular real or virtual object is longer than a threshold time, the real or virtual object may be selected as the user input. In some implementations, the vergence of the user's eyes can be tracked and an accommodation/vergence model can be used to determine the accommodation state of the user's eyes, which provides information on a depth plane on which the user is focusing. In some implementations, the wearable system can use ray casting techniques to determine which real or virtual objects are along the direction of the user's head pose or eye pose. In various implementations, the ray casting techniques can include casting thin, pencil rays with substantially little transverse width or casting rays with substantial transverse width (e.g., cones or frustums).

The user interface may be projected by the display system as described herein (such as the display 220 in FIG. 2). It may also be displayed using a variety of other techniques such as one or more projectors. The projectors may project images onto a physical object such as a canvas or a globe. Interactions with user interface may be tracked using one or more cameras external to the system or part of the system (such as, e.g., using the inward-facing imaging system 462 or the outward-facing imaging system 464).

Figure 11:
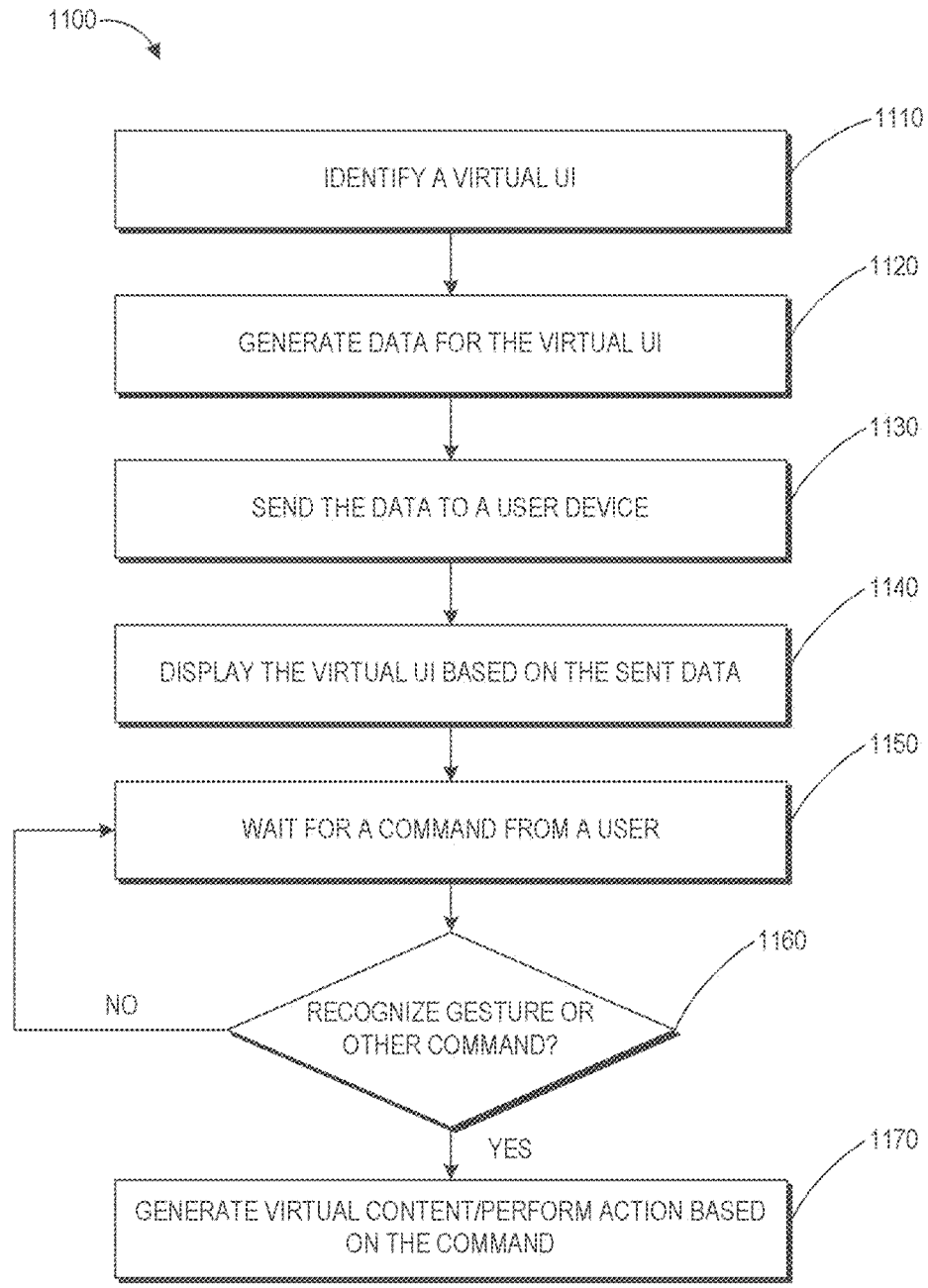
FIG. 11 is a process flow diagram of an example of a method for interacting with a virtual user interface.

FIG. 11 is a process flow diagram of an example of a method 1100 for interacting with a virtual user interface. The method 1100 may be performed by the wearable system described herein.

At block 1110, the wearable system may identify a particular UI. The type of UI may be predetermined by the user. The wearable system may identify that a particular UI needs to be populated based on a user input (e.g., gesture, visual data, audio data, sensory data, direct command, etc.). At block 1120, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. If the UI is hand centric, the map coordinates of the user's hands may be determined. These map points may be derived through data received through the FOV cameras, sensory input, or any other type of collected data.

At block 1130, the wearable system may send the data to the display from the cloud or the data may be sent from a local database to the display components. At block 1140, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 1150. For example, the UI may be a body centric ring around the user's body. The wearable system may then wait for the command (a gesture, a head or eye movement, input from a user input device, etc.), and if it is recognized (block 1160), virtual content associated with the command may be displayed to the user (block 1170). As an example, the wearable system may wait for user's hand gestures before mixing multiple steam tracks.

Additional examples of wearable systems, UIs, and user experiences (UX) are described in U.S. Patent Publication No. 2015/0016777, which is incorporated by reference herein in its entirety.

Overview of User Interactions Based on Contextual Information

The wearable system can support various user interactions with objects in the FOR based on contextual information. For example, the wearable system can adjust the size of the aperture of a cone with a user interacts with objects using cone casting. As another example, the wearable system can adjust the amount of movement of virtual objects associated with an actuation of a user input device based on the contextual information. Detailed examples of these interactions are provided below.

Example Objects

A user's FOR can contain a group of objects which can be perceived by the user via the wearable system. The objects within the user's FOR may be virtual and/or physical objects. The virtual objects may include operating system objects such as e.g., a recycle bin for deleted files, a terminal for inputting commands, a file manager for accessing files or directories, an icon, a menu, an application for audio or video streaming, a notification from an operating system, and so on. The virtual objects may also include objects in an application such as e.g., avatars, virtual objects in games, graphics or images, etc. Some virtual objects can be both an operating system object and an object in an application. In some embodiments, the wearable system can add virtual elements to the existing physical objects. For example, the wearable system may add a virtual menu associated with a television in the room, where the virtual menu may give the user the option to turn on or change the channels of the television using the wearable system.

The objects in the user's FOR can be part of a world map as described with reference to FIG. 9. Data associated with objects (e.g. location, semantic information, properties, etc.) can be stored in a variety of data structures such as, e.g., arrays, lists, trees, hashes, graphs, and so on. The index of each stored object, wherein applicable, may be determined, for example, by the location of the object. For example, the data structure may index the objects by a single coordinate such as the object's distance from a fiducial position (e.g., how far to the left (or right) of the fiducial position, how far from the top (or bottom) of the fiducial position, or how far depth-wise from the fiducial position). In some implementations, the wearable system comprises a light field display that is capable of displaying virtual objects at different depth planes relative to the user. The interactable objects can be organized into multiple arrays located at different fixed depth planes.

A user can interact with a subset of the objects in the user's FOR. This subset of objects may sometimes be referred to as interactable objects. The user can interact with objects using a variety of techniques, such as e.g. by selecting the objects, by moving the objects, by opening a menu or toolbar associated with an object, or by choosing a new set of interactable objects. The user may interact with the interactable objects by using hand gestures to actuate a user input device (see e.g. user input device 466 in FIG. 4), such as, e.g., clicking on a mouse, tapping on a touch pad, swiping on a touch screen, hovering over or touching a capacitive button, pressing a key on a keyboard or a game controller (e.g., a 5-way d-pad), pointing a joystick, wand, or totem toward the object, pressing a button on a remote control, or other interactions with a user input device, etc. The user may also interact with interactable objects using head, eye, or body pose, such as e.g., gazing or pointing at an object for a period of time. These hand gestures and poses of the user can cause the wearable system to initiate a selection event in which, for example, a user interface operation is performed (a menu associated with the target interactable object is displayed, a gaming operation is performed on an avatar in a game, etc.).

Examples of Cone Casting

As described herein, a user can interact with objects in his environment using poses. For example, a user may look into a room and see tables, chairs, walls, and a virtual television display on one of the walls. To determine which objects the user is looking toward, the wearable system may use a cone casting technique that, described generally, projects an invisible cone in the direction the user is looking and identifies any objects that intersect with the cone. The cone casting can involve casting a single ray, having no lateral thickness, from an HMD (of the wearable system) toward physical or virtual objects. Cone casting with a single ray may also be referred to as ray casting.

Ray casting can use a collision detection agent to trace along the ray and to identify if and where any objects intersect with the ray. The wearable system can track the user's pose (e.g., body, head, or eye direction) using inertial measurement units (e.g., accelerometers), eye-tracking cameras, etc., to determine the direction toward which the user is looking. The wearable system can use the user's pose to determine which direction to cast the ray. The ray casting techniques can also be used in connection with user input devices 466 such as a hand-held, multiple degree of freedom (DOF) input device. For example, a user can actuate the multi-DOF input device to anchor the size and/or length of the ray while the user moves around. As another example, rather than casting the ray from the HMD, the wearable system can cast the ray from the user input device.

Figure 12A:
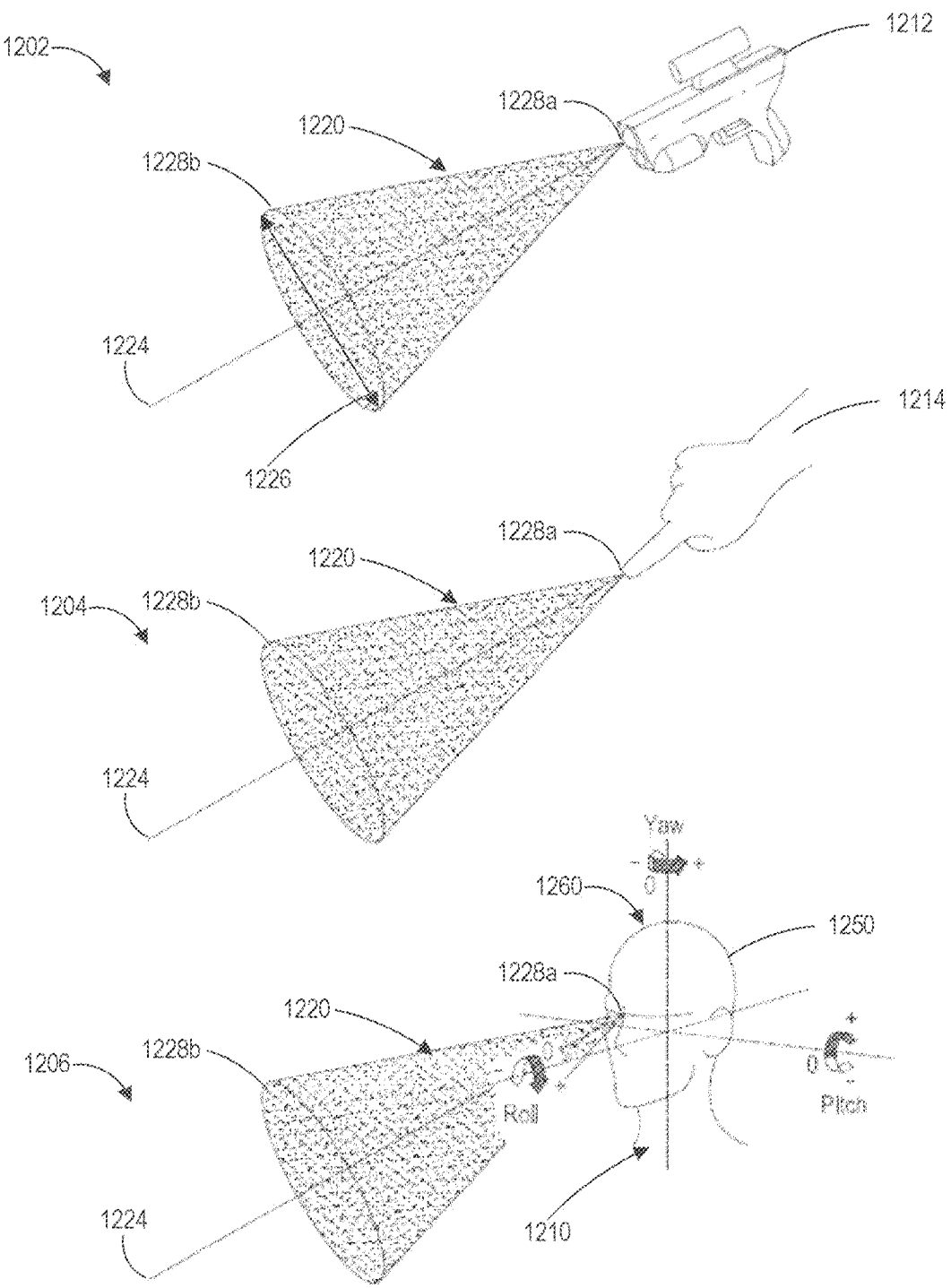
FIG. 12A illustrates examples of cone casting with non-negligible apertures.

In certain embodiments, rather than casting a ray with negligible thickness, the wearable system can cast a cone having a non-negligible aperture (transverse to a central ray 1224). FIG. 12A illustrates examples of cone casting with non-negligible apertures. Cone casting can cast a conic (or other shape) volume 1220 with an adjustable aperture. The cone 1220 can be a geometric cone which has a proximal end 1228a and a distal end 1228b. The size of the aperture can correspond to the size of the distal end 1228b of the cone. For example, a large aperture may correspond to a large surface area at a distal end 1228b of the cone (e.g., the end that is away from the HMD, the user, or the user input device). As another example, a large aperture can correspond to a large diameter 1226 on the distal end 1228b of the cone 1220 while a small aperture can correspond to a small diameter 1226 on the distal end 1228b of the cone 1220. As described further with reference to FIG. 12A, the proximal end 1228a of the cone 1220 can have its origin at various positions, e.g., the center of the user's ARD (e.g., between the user's eyes), a point on one of the user's limbs (e.g., a hand, such as a finger of the hand), a user input device or totem being held or operated by the user (e.g., a toy weapon).

The central ray 1224 can represent the direction of the cone. The direction of the cone can correspond to the user's body pose (such as head pose, hand gestures, etc.) or the user's direction of gaze (also referred to as eye pose). The example 1206 in FIG. 12A illustrates cone casting with poses, where the wearable system can determine the direction 1224 of the cone using the user's head pose or eye pose. This example also illustrates a coordinate system for the head pose. A head 1250 may have multiple degrees of freedom. As the head 1250 moves toward different directions, the head pose will change relative to the natural resting direction 1260. The coordinate system in FIG. 12A shows three angular degrees of freedom (e.g. yaw, pitch, and roll) that can be used for measuring the head pose relative to the natural resting state 1260 of the head. As illustrated in FIG. 12A, the head 1250 can tilt forward and backward (e.g. pitching), turning left and right (e.g. yawing), and tilting side to side (e.g. rolling). In other implementations, other techniques or angular representations for measuring head pose can be used, for example, any other type of Euler angle system. The wearable system may determine the user's head pose using IMUs. The inward-facing imaging system 462 (shown in FIG. 4) can be used to determine the user's eye pose.

The example 1204 shows another example of cone casting with poses, where the wearable system can determine the direction 1224 of the cone based on a user's hand gestures. In this example, the proximal end 1228a of the cone 1220 is at the tip of the user's finger 1214. As the user points his finger to another location, the position of cone 1220 (and the central ray 1224) can be moved accordingly.

The direction of the cone can also correspond to a position or orientation of the user input device or an actuation of the user input device. For example, the direction of the cone may be based on a user drawn trajectory on a touch surface of the user input device. The user can move his finger forward on the touch surface to indicate that the direction of the cone is forward. The example 1202 illustrates another cone casting with a user input device. In this example, the proximal end 1228*a* is located at the tip of a weapon-shaped user input device 1212. As the user input device 1212 is moved around, the cone 1220 and the central ray 1224 can also move together with the user input device 1212.

The direction of the cone can further be based on the position or orientation of the HMD. For example, the cone may be casted at a first direction when the HMD is tilted while at a second direction when the HMD is not tilted.

Initiation of a Cone Cast

The wearable system can initiate a cone cast when the user 1210 actuates a user input device 466, for example by clicking on a mouse, tapping on a touch pad, swiping on a touch screen, hovering over or touching a capacitive button, pressing a key on a keyboard or a game controller (e.g., a 5-way d-pad), pointing a joystick, wand, or totem toward the object, pressing a button on a remote control, or other interactions with a user input device, etc.

The wearable system may also initiate a cone cast based on a pose of the user 1210, such as, e.g., an extended period of gaze toward one direction or a hand gesture (e.g., waving in front of the outward-facing imaging system 464). In some implementations, the wearable system can automatically begin the cone cast event based on contextual information. For example, the wearable system may automatically begin the cone cast when the user is at the main page of the AR display. In another example, the wearable system can determine relative positions of the objects in a user's direction of gaze. If the wearable system determines that the objects are located relatively far apart from each other, the wearable system may automatically begin a cone cast so the user does not have to move with precision to select an object in a group of the sparsely located objects.

Example Properties of a Cone

The cone 1220 may have a variety of properties such as, e.g., size, shape, or color. These properties may be displayed to the user so that the cone is perceptible to the user. In some cases, portions of the cone 1220 may be displayed (e.g., an end of the cone, a surface of the cone, a central ray of the cone, etc.). In other embodiments, the cone 1220 may be a cuboid, polyhedron, pyramid, frustum, etc. The distal end 1228*b* of the cone can have any cross section, e.g., circular, oval, polygonal, or irregular.

Figure 12B:
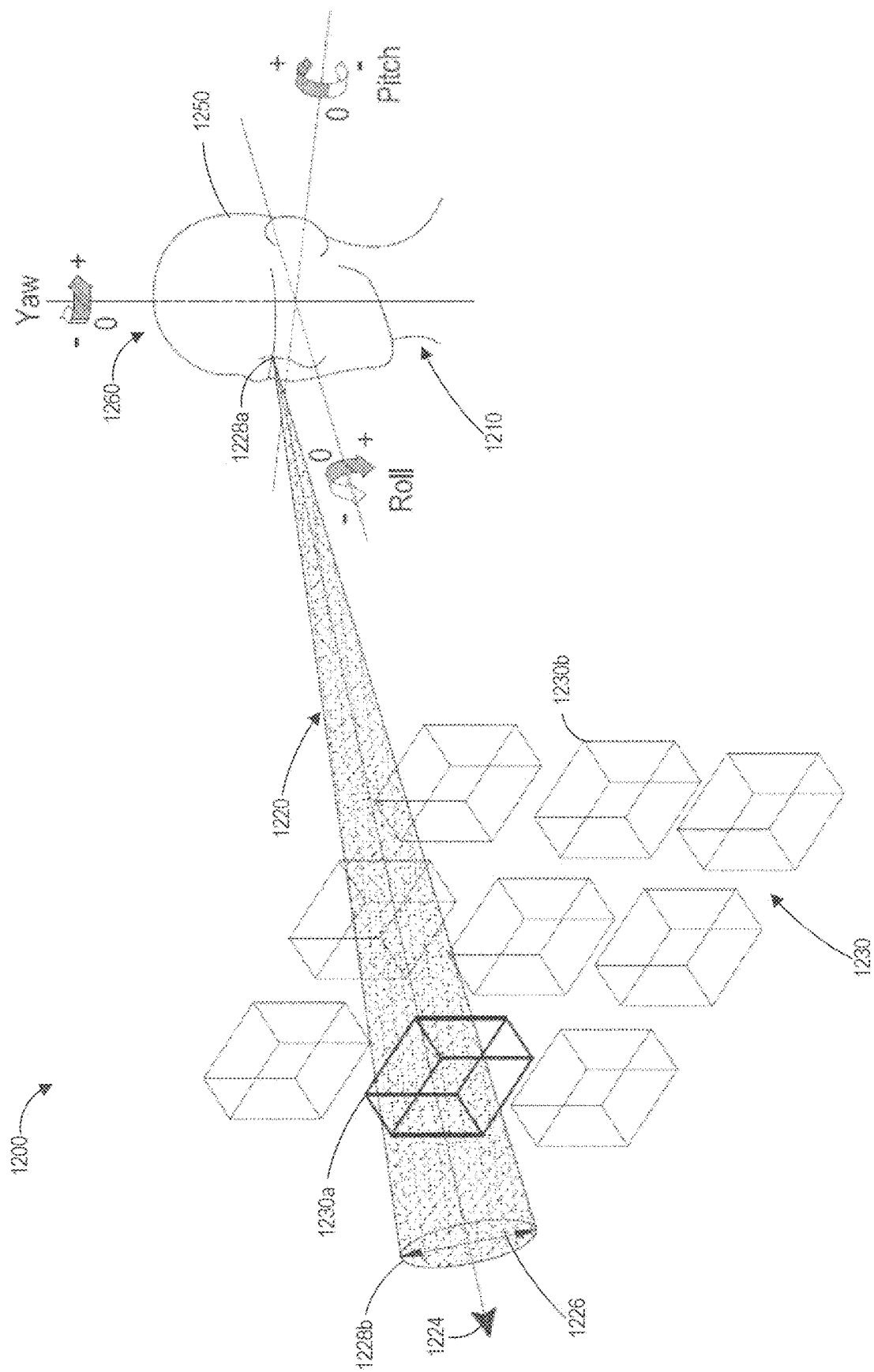
FIGS. 12B and 12C are examples of selecting a virtual object using cone casting with different dynamically adjusted apertures.
Figure 12C:
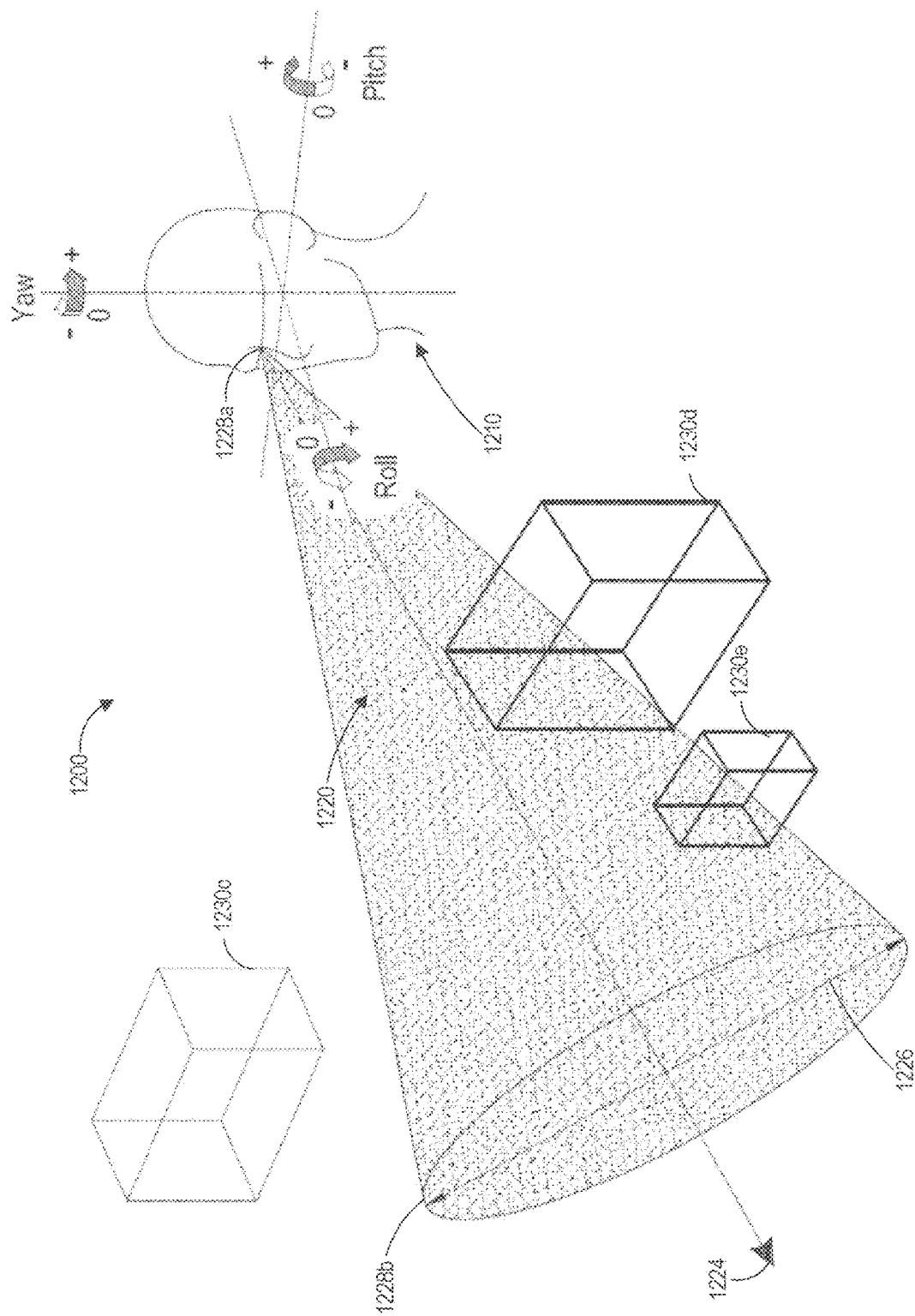

In FIGS. 12A, 12B, and 12C, the cone 1220 can have a proximal end 1228*a* and a distal end 1228*b*. The proximal end 1228*a* (also referred to as zero point of the central ray 1224) can be associated with the place from which cone cast originates. The proximal end 1228*a* may be anchored to a location in the 3D space, such that the virtual cone appears to be emitted from the location. The location may be a position on a user's head (such as between the user's eyes), a user input device (such as, e.g., a 6 DOF hand-held controller or a 3DOF hand-held controller) functioning as a pointer; the tip of a finger (which can be detected by gesture recognition), and so on. For a hand-held controller, the location to which the proximal end 1228*a* is anchored may depend on the form factor of the device. For example, in a weapon-shaped controller 1212 (for use in a shooting game), the proximal end 1228*a* may be at the tip of the muzzle of the controller 1212. In this example, the proximal end 1228*a* of the cone can originate at the center of the barrel and the cone 1220 (or the central ray 1224) of the cone 1220 can project forward such that the center of the cone cast would be concentric with the barrel of the weapon-shaped controller 1212. The proximal end 1228*a* of the cone can be anchored to any locations in the user's environment in various embodiments.

Once the proximal end 1228*a* of the cone 1220 is anchored to a location, the direction and movement of the cone 1220 may be based on the movement of the object associated with the location. For example, as described with reference to the example 1206, when the cone is anchored to the user's head, the cone 1220 can move based on the user's head pose. As another example, in the example 1202, when the cone 1220 is anchored to a user input device, the cone 1220 can be moved based on the actuation of the user input device, such as, e.g., based on changes in the position or orientation of the user input device.

The distal end 1228*b* of the cone can extend until it reaches a termination threshold. The termination threshold may involve a collision between the cone and a virtual or physical object (e.g., a wall) in the environment. The termination threshold may also be based on a threshold distance. For example, the distal end 1228*b* can keep extending away from the proximal end 1228*a* until the cone collides with an object or until the distance between the distal end 1228*b* and the proximal end 1228*a* has reached a threshold distance (e.g., 20 centimeters, 1 meter, 2 meters, 10 meters, etc.). In some embodiments, the cone can extend beyond objects even though the collisions may happen between the cone and the objects. For example, the distal end 1228*b* can extend through real world objects (such as tables, chairs, walls, etc.) and terminate when it hits a termination threshold. Assuming that the termination threshold is the wall of a virtual room which is located outside of the user's current room, the wearable system can extend the cone beyond the current room until it reaches a surface of the virtual room. In certain embodiments, world meshes can be used to define the extents of one or more rooms. The wearable system can detect the existence of the termination threshold by determining whether the virtual cone has intersected with a portion of the world meshes. Advantageous, in some embodiments, the user can easily target virtual objects when the cone extends through real world objects. As an example, the HMD can present a virtual hole on the physical wall, through which the user can remotely interact with the virtual content in the other room even though the user is not physically in the other room. The HMD can determine objects in the other room based on the world map described in FIG. 9.

The cone 1220 can have a depth. The depth of the cone 1220 may be expressed by the distance between the proximal end 1228*a* and the distal end 1228*b* of the cone 1220. The depth of the cone can be adjusted automatically by the wearable system, the user, or in combination. For example, when the wearable system determines that the objects are located far away from the user, the wearable system may increase the depth of the cone. In some implementations, the depth of the cone may be anchored to a certain depth plane. For example, a user may choose to anchor the depth of the cone to a depth plane that is within 1 meter of the user. As a result, during a cone cast, the wearable system will not capture objects that are outside of the 1 meter boundary. In certain embodiments, if the depth of the cone is anchored to a certain depth plane, the cone cast will only capture the objects at the depth plane. Accordingly, the cone cast will not capture objects that are closer to the user or farther away from the user than the anchored depth plane. In addition to or in alternative to setting the depth of the cone 1220, the wearable system can set the distal end 1228*b* to a depth plane such that the cone casting can allow user interactions with objects at the depth plane or less than the depth planes.

The wearable system can anchor the depth, the proximal end 1228a, or the distal end 1228b of the cone upon detection of a certain hand gesture, a body pose, a direction of gaze, an actuation of a user input device, a voice command, or other techniques. In addition to or in alternative to the examples described herein, the anchoring location of the proximal end 1228a, the distal end 1228b, or the anchored depth can be based contextual information, such as, e.g., the type of user interactions, the functions of the object to which the cone is anchored, etc. For example, the proximal end 1228a can be anchored to the center of the user's head due to user usability and feel. As another example, when a user points at objects using hand gestures or a user input device, the proximal end 1228a can be anchored to the tip of the user's finger or the tip of the user input device to increase the accuracy of the direction that the user is point to.

The cone 1220 can have a color. The color of the cone 1220 may depend on the user's preference, the user's environment (virtual or physical), etc. For example, if the user is in a virtual jungle which is full of trees with green leaves, the wearable system may provide a dark gray cone to increase contrast between the cone and the objects in the user's environment so that the user can have a better visibility for the location of the cone.

The wearable system can generate a visual representation of at least a portion of the cone for display to a user. The properties of the cone 1220 may be reflected in the visual representation of the cone 1220. The visual representation of the cone 1220 can correspond to at least a portion of the cone, such as the aperture of the cone, the surface of the cone, the central ray, etc. For example, where the virtual cone is a geometric cone, visual representation of the virtual cone may include a grey geometric cone extending from a position in-between the user's eyes. As another example, the visual representation may include the portion of the cone that interacts with the real or virtual content. Assuming the virtual cone is the geometric cone, the visual representation may include a circular pattern representing the base of the geometric cone because the base of the geometric cone can be used to target and select a virtual object. In certain embodiments, the visual representation is triggered based on a user interface operation. As an example, the visual representation may be associated with an object's state. The wearable system can present the visual representation when an object changes from a resting state or a hover state (where the object can be moved or selected). The wearable system can further hide the visual representation when the object changes from the hover state to a selected state. In some implementations, when the objects are at the hover state, the wearable system can receive inputs from a user input device (in addition to or in alternative to a cone cast) and can allow a user to select a virtual object using the user input device when the objects are at the hover state.

In certain embodiments, the cone 1220 may be invisible to the user. The wearable system may assign a focus indicator to one or more objects indicating the direction and/or location of the cone. For example, the wearable system may assign a focus indicator to an object which is in front of the user and intersects with the user's direction of gaze. The focus indicator can comprise a halo, a color, a perceived size or depth change (e.g., causing the target object to appear closer and/or larger when selected), a change in the shape of the cursor sprite graphic (e.g. the cursor is changed from a circle to an arrow), or other audible, tactile, or visual effects which draw the user's attention.

The cone 1220 can have an aperture transverse to the central ray 1224. In some embodiments, the central ray 1224 is invisible to the user 1210. The size of the aperture can correspond to the size of the distal end 1228b of the cone. For example, a large aperture can correspond to a large diameter 1226 on the distal end 1228b of the cone 1220 while a small aperture can correspond to a small diameter 1226 on the distal end 1228b of the cone 1220.

As further described with reference to FIGS. 12B and 12C, the aperture can be adjusted by the user, the wearable system, or in combination. For example, the user may adjust the aperture through user interface operations such as selecting an option of the aperture shown on the AR display. The user may also adjust the aperture by actuating the user input device, for example, by scrolling the user input device, or by pressing a button to anchor the size of the aperture. In addition or alterative to inputs from user, the wearable system can update the size of the aperture based on one or more contextual factors described below.

Examples of Cone Casting with Dynamically Updated Aperture

Cone casting can be used to increase precision when interacting with objects in the user's environment, especially when those objects are located at a distance where small amounts of movement from the user could translate to large movements of the ray. Cone casting could also be used to decrease the amount of movement necessary from the user in order to have the cone overlap one or more virtual objects. In some implementations, the user can manually update the aperture of the cone and improve the speed and precision of selecting a target object, for example, by using narrower cones when there are many objects and wider cones when there are fewer objects. In other implementations, the wearable system can determine contextual factors associated with objects in the user's environment and permit automatic cone updating, additionally or alternatively to manual updating, which can advantageously make it easier for users to interact with objects in the environment since less user input is needed.

FIGS. 12B and 12C provides examples of cone casting on a group 1230 of objects (e.g. 1230a, 1230b, 1230c, 1230d, 1230e) in the user's FOR 1200 (at least some of these objects are in the user's FOV). The objects may be virtual and/or physical objects. During a cone cast, the wearable system can cast a cone (visible or invisible to the user) 1220 in a direction and identify any objects that intersect with the cone 1220. For example, in FIG. 12B, the object 1230a (shown in bold) intersects with the cone 1220. In FIG. 12C, the objects 1230d and 1230e (shown in bold) intersect with the cone 1220. The objects 1230b, 1230c (shown in grey) are outside the cone 1220 and do not intersect with the cone 1220.

The wearable system can automatically update the aperture based on contextual information. The contextual information may include information related to the user's environment (e.g. light conditions of the user's virtual or physical environment), the user's preferences, the user's physical conditions (e.g. whether a user is near-sighted), information associated with objects in the user's environment, such as the type of the objects (e.g., physical or virtual) in the user's environment, or the layout of the objects (e.g., the density of the objects, the locations and sizes of the objects, and so forth), the characteristics of the objects that a user is interacting with (e.g., the functions of the objects, the type of user interface operations supported by the objects, etc.), in combination or the like. The density can be measured in a variety of ways, e.g., a number of objects per projected area, a number of objects per solid angle, etc. The density may be represented in other ways such as, e.g., a spacing between neighboring objects (with smaller spacing reflecting increased density). The wearable system can use location information of the objects to determine the layout and density of the objects in a region. As shown in FIG. 12B, the wearable system may determine that the density of the group 1230 of the objects is high. The wearable system may accordingly use a cone 1220 with a smaller aperture. In FIG. 12C, because the objects 1230d and 1230c are located relatively far away from each other, the wearable system may use a cone 1220 with a larger aperture (as compared to the cone in FIG. 12B). Additional details on calculating the density of objects and adjusting the aperture size based on the density are further described in FIGS. 12D-12G.

The wearable system can dynamically update the aperture (e.g. size or shape) based on the user's pose. For example, the user may initially look at the group 1230 of the objects in FIG. 12B, but as the user turns his head, the user may now look at the group of objects in FIG. 12C (where the objects are located sparsely relative to each other). As a result, the wearable system may increase the size of the aperture (e.g., as shown by the change in the aperture of the cone between FIG. 12B and FIG. 12C). Similarly, if the user turns his head back to look at the group 1230 of the objects in FIG. 12B, the wearable system may decrease the size of the aperture.

Additionally or alternatively, the wearable system can update the aperture size based on user's preference. For example, if the user prefers to select a large group of items at the same time, the wearable system may increase the size of the aperture.

As another example of dynamically updating aperture based on contextual information, if a user is in a dark environment or if the user is near-sighted, the wearable system may increase the size of the aperture so that it is easier for the user to capture objects. In certain implementations, a first cone cast can capture multiple objects. The wearable system can perform a second cone cast to further select a target object among the captured objects. The wearable system can also allow a user to select the target object from the captured objects using body poses or a user input device. The object selection process can be a recursive process where one, two, three, or more cone casts may be performed to select the target object.

Examples of Dynamically Updating Aperture Based on the Density of Objects

Figure 12D:
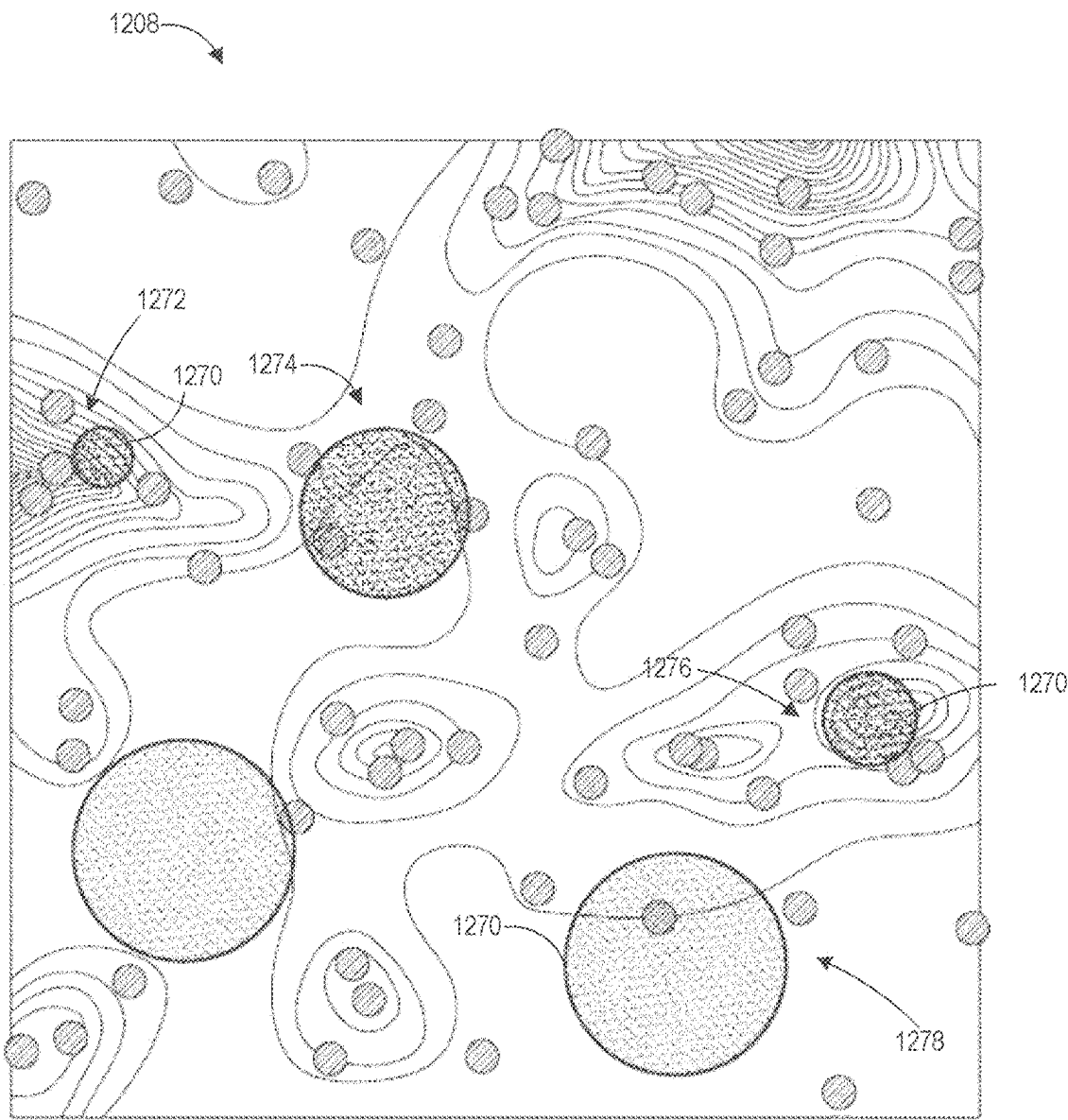
FIGS. 12D, 12E, 12F, and 12G describe examples of dynamically adjusting an aperture based on the density of objects.

As described with reference to FIGS. 12B and 12C, the aperture of the cone can be dynamically updated during a cone cast based on the density of objects in the user's FOR. FIGS. 12D, 12E, 12F, and 12G describe examples of dynamically adjusting an aperture based on the density of objects. FIG. 12D illustrates a contour map associated with density of objects in the user's FOR 1208. The virtual objects 1271 are represented by small textured dots. The density of the virtual objects is reflected by the amount of contour lines in a given region. For example, the counter lines are close to each other in the region 1272 which represents that the density of objects in the region 1272 is high. As another example, the contour lines in the region 1278 are relatively sparse. Accordingly, the density of objects in the region 1278 is low.

The visual presentation the aperture 1270 is illustrated in shaded circles in FIG. 12D. The visual representation in this example can correspond to the distal end 1228b of the virtual cone 1220. The aperture size can change based on the density of objects in a given region. For example, the aperture size can depend on the density of objects where the center of the circle falls. As illustrated in FIG. 12D, when the aperture is at the region 1272, the size of the aperture 1270 can decrease (as shown by the relatively small size of the aperture circle). However, when the user is staring at the region 1276 in the FOR 1208, the size of the aperture 1270 became slightly bigger than the size at the region 1272. When the user further changes his head pose to look at the region 1274, the size of the aperture became bigger than the size at the region 1276 since the density of objects at the region 1274 is lower than that of the region 1276. As yet another example, at region 1278, the size of the aperture 1270 will increase because there are rarely any objects in the region 1278 of the FOR 1208. Although the density is illustrated with contour maps in these examples, the density can also be determined using a heat map, surface plot, or other graphical or numerical representations. In general, the term contour map includes these other types of density representations (in 1D, 2D, or 3D). Further, the contour map generally is not presented to the user, but may be calculated and used by the ARD processor to dynamically determine the properties of the cone. The contour map may be dynamically updated as the physical or virtual objects move in the user's FOV or FOR.

Figure 12E:
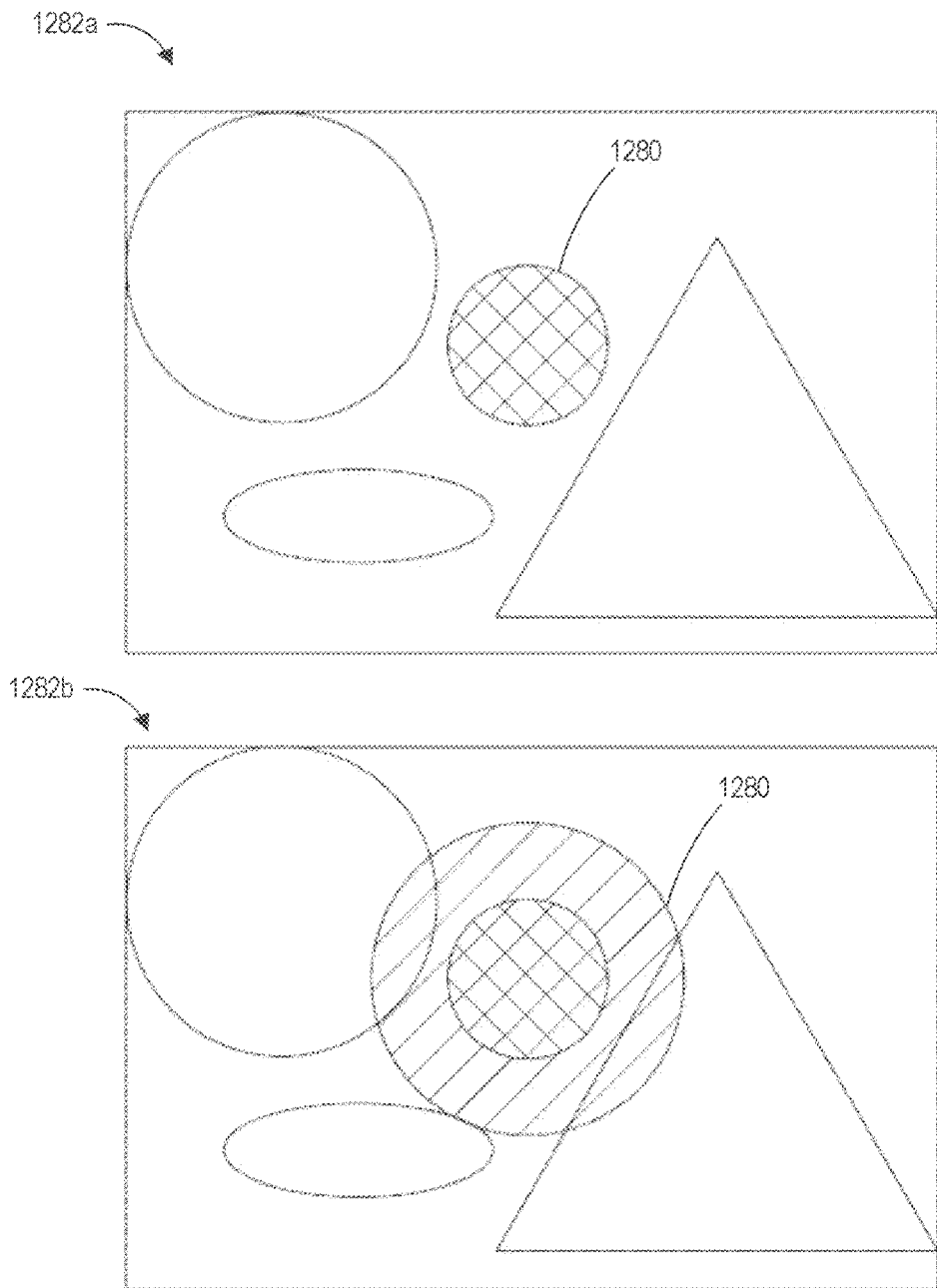
Figure 12F:
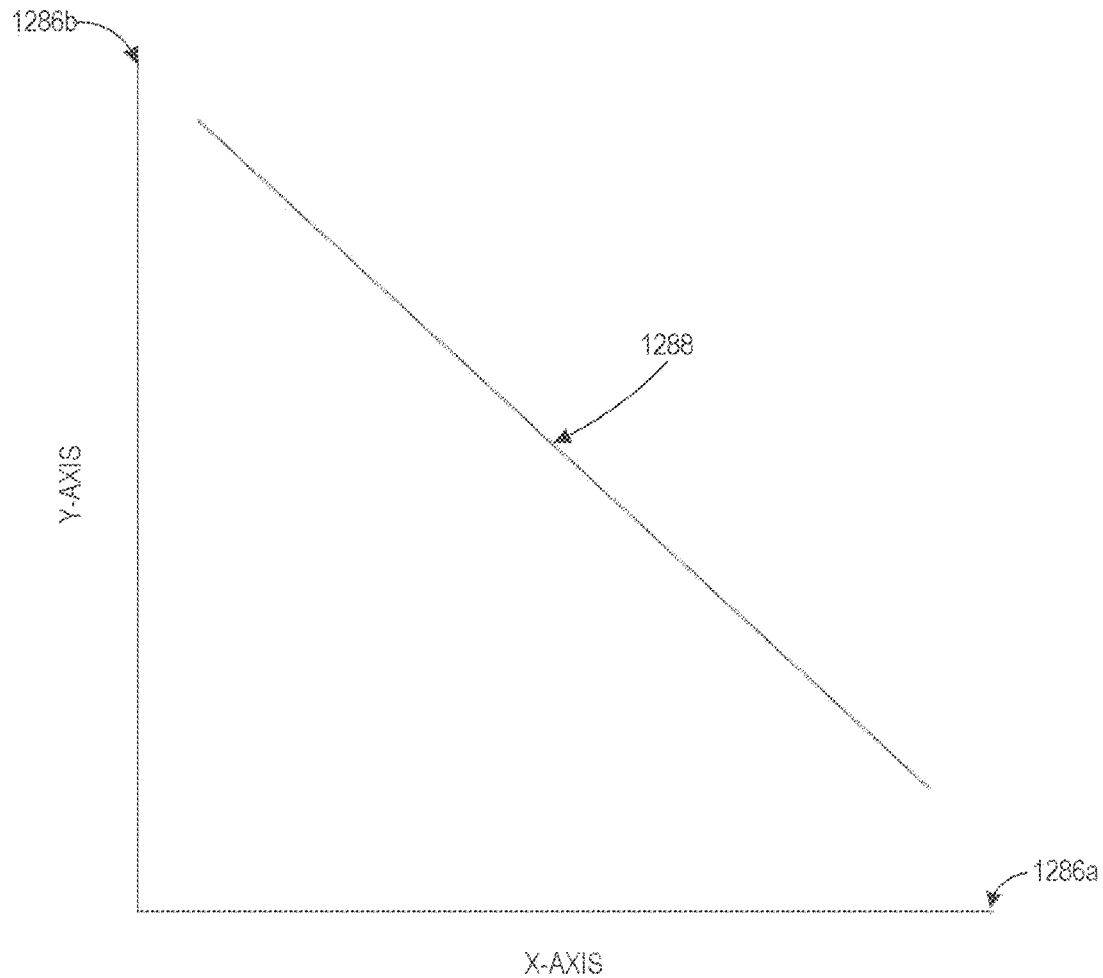

A variety of techniques can be employed for calculating the density of objects. As one example, the density can be calculated by counting all of the virtual objects within a user's FOV. The number of the virtual objects may be used as an input to a function which specifies the size of the aperture based on the number of virtual objects in the FOV. The image 1282a in FIG. 12E shows an FOV with three virtual objects, represented by a circle, an ellipse, and a triangle as well as a virtual representation of an aperture 1280 which is illustrated using a textured circle. However, when the number of virtual objects decreases from three (in image 1282a) to two (in image 1282b), the size of the aperture 1280 can increase accordingly. The wearable system can use the function 1288 in FIG. 12F to calculate the amount of increase. In this figure, the size of the aperture is represented by the y-axis 1286b while the number (or density) of virtual objects in the FOV is represented by the x-axis 1286a. As illustrated, when the number of virtual objects increases (e.g., the density increases), the size of the aperture decreases according to function 1288. In certain embodiments, the smallest aperture size is zero which reduces the cone to a single ray. Although the function 1288 is illustrated as a linear function, any other type of functions, such as one or more power law functions, may also be used. In some embodiments, the function 1288 may include one or more threshold conditions. For example, when the density of objects has reached a certain low threshold, the size of the aperture 1280 will no longer increase even though the density of objects may further decrease. On the other hand, when the density of objects has reached a certain high threshold, the size of the aperture 1280 will no longer decrease even though the density of the objects may further increase. However, when the density is between the low and high threshold, the aperture size may decrease following an exponential function, for example.

Figure 12G:
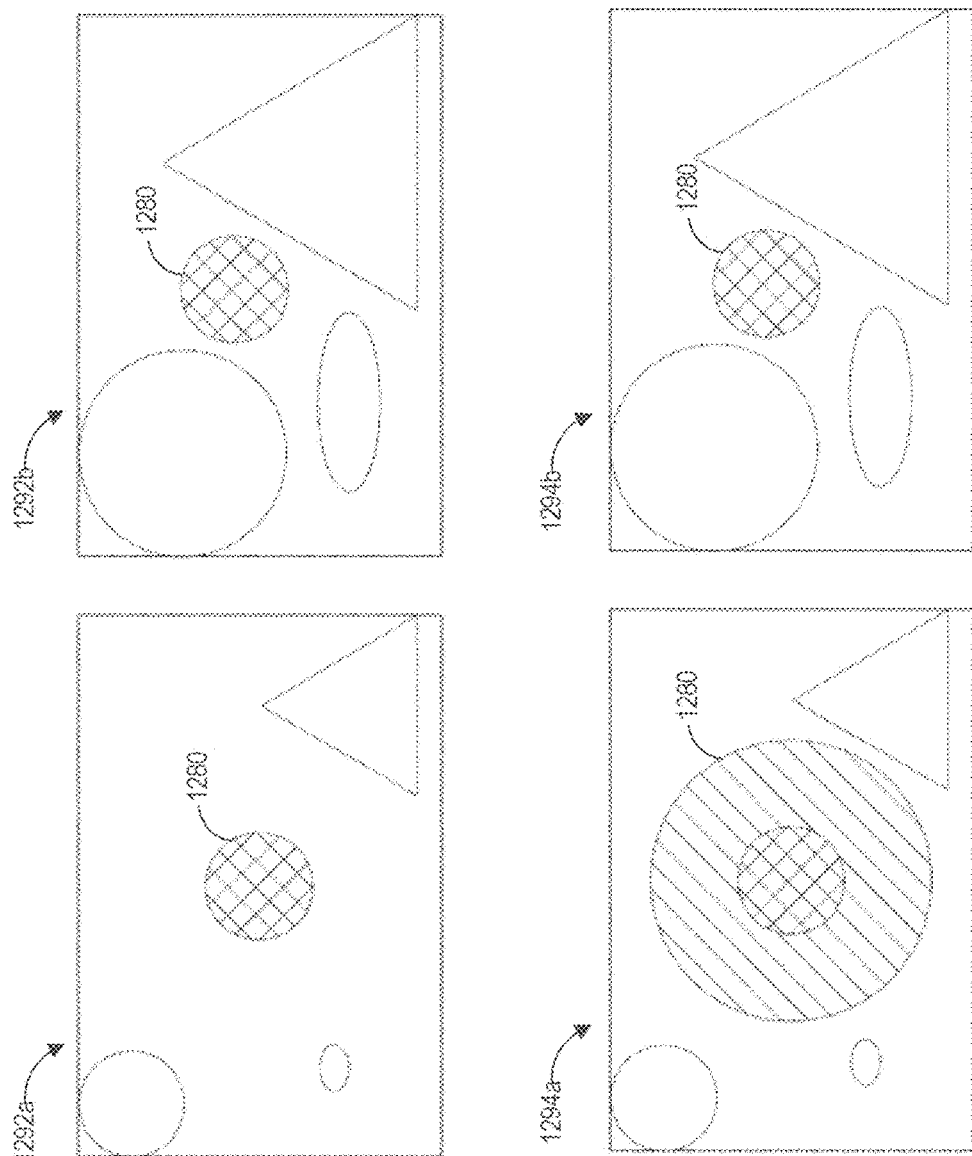

FIG. 12G illustrates another example technique for calculating density. For example, in addition to or in alternative to calculating the number of virtual objects in the FOV, the wearable system can calculate the percentage of the FOV covered by virtual objects. The images 1292a and 1292b illustrate adjusting the aperture size based on the number of objects in the FOV. As illustrated in this example, although the percentage of the FOV covered by virtual images is different between the images 1292a and 1292b (where the objects in the image 1292a are positioned more sparsely), the size of the aperture 1280 does not change in these two images because the number of objects (e.g., three virtual objects) is the same across the images 1292a and 1292b. In contrast, the images 1294a and 1294b illustrate adjusting aperture size based on the percentage of FOV covered by the virtual objects. As shown in the image 1294a, the aperture 1280 will increase in size (as opposed to remaining the same in the image 1292a) because a lower percentage of the FOV is covered by the virtual objects.

Examples of a Collision

The wearable system can determine whether one or more objects collide with the cone during the cone cast. The wearable system may use a collision detection agent to detect collision. For example, the collision detection agent can identify the objects intersecting with the surface of the cone and/or identify the objects which are inside of the cone. The wearable system can make such identifications based on volume and location of the cone, as well as the location information of the objects (as stored in the world map described with reference to FIG. 9). The objects in the user's environment may be associated with meshes (also referred to as world mesh). The collision detection agent can determine whether a portion for cone overlaps with the mesh of an object to detect collision. In certain implementations, the wearable system may be configured to only detect collisions between the cone and the objects on a certain depth plane.

The wearable system may provide a focus indicator to objects that collide with the cone. For example, in FIGS. 12B and 12C, the focus indicator may be a red highlight around all or part of the object. Accordingly, in FIG. 12B, when the wearable system determines that the object 1230a intersects with the cone 1220, the wearable system can display a red highlight around the object 1230a to the user 1210. Similarly, in FIG. 12C, the wearable system identifies the object 1230e and the 1230d as objects intersecting with the cone 1220. The wearable system can provide red highlights around object 1230d and object 1230e.

When the collision involves multiple objects, the wearable system may present a user interface element for selecting one or more objects among the multiple objects. For example, the wearable system can provide a focus indicator which can indicate a target object with which a user is currently interacting. The user can use hand gestures to actuate a user input device and move the focus indicator to another target object.

In some embodiments, an object may be behind another object in the user's 3D environment (e.g., the nearby object at least partly occludes the more distant object). Advantageously, the wearable system may apply disambiguation techniques (e.g., to determine occluded objects, determine depth ordering or position among occluded objects, etc.) during a cone cast to capture both the object in the front and the object in the back. For example, a paper shredder may be behind a computer in the user's room. Although the user may not be able to see the shredder (since it is blocked by the computer), the wearable system can cast a cone in the direction of the computer and detect collisions for both the shredder and the computer (because both the shredder and the computer are in the wearable system's world map). The wearable system can display a pop up menu to provide a choice for the user to select either the shredder or the computer or the wearable system may use the contextual information to determine which object to select (e.g., if the user is attempting to delete a document, the system may select the paper shredder). In certain implementations, the wearable system may be configured to only capture the object in the front. In this example, the wearable system will only detect collision between the cone and the paper shredder.

Upon the detection of the collision, the wearable system may allow the user to interact with interactable objects in a variety of ways, such as, e.g., selecting the objects, moving the objects, opening a menu or toolbar associated with an object, or performing a game operation on an avatar in a game, etc. The user may interact with the interactable objects through poses (e.g. head, body poses), hand gestures, inputs from a user input device, in combination or the like. For example, when the cone collides with multiple interactable objects, the user may actuate a user input device to select among the multiple interactable objects.

Example Processes of Dynamically Updating Aperture

Figure 13:
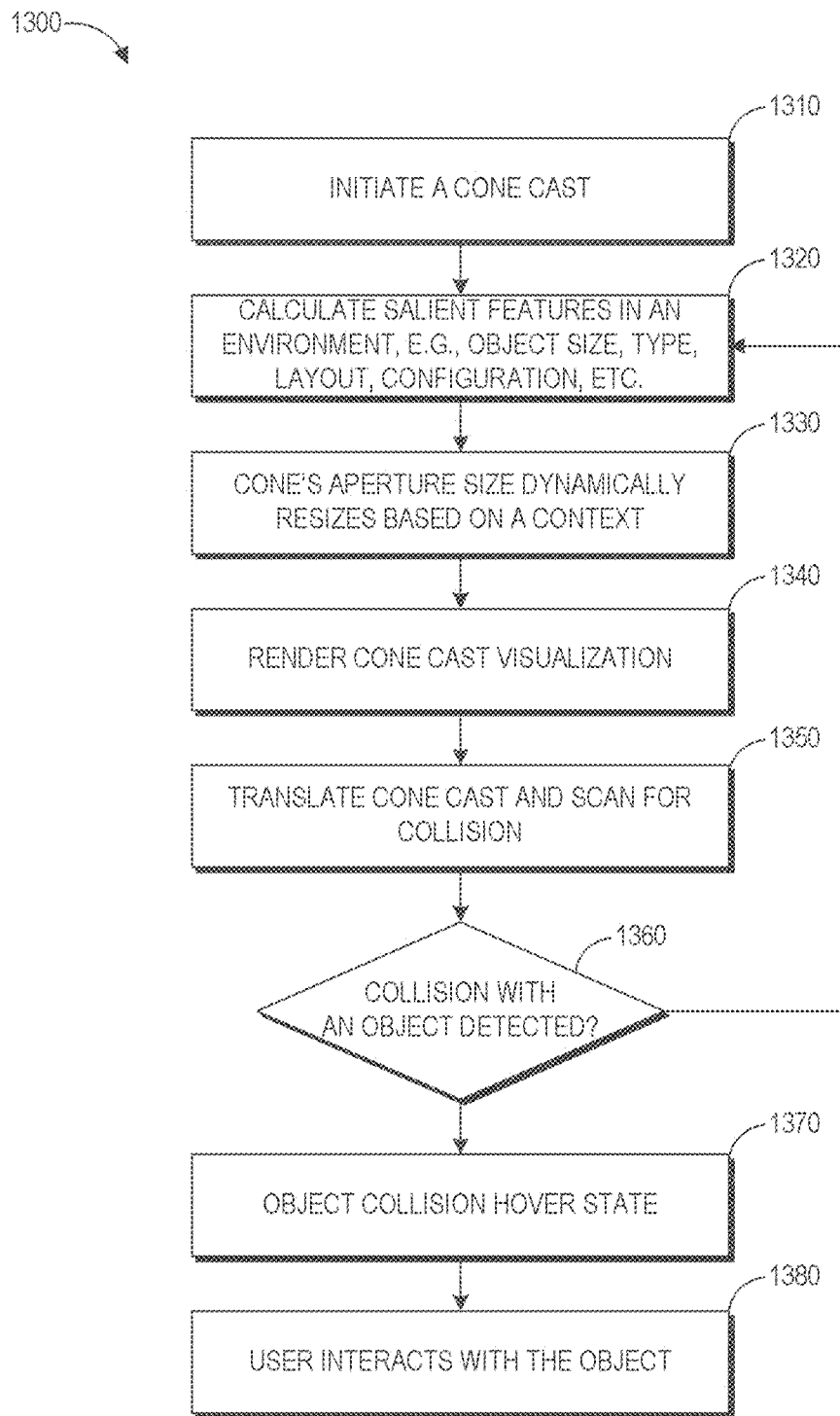
FIGS. 13, 14, and 15 are flowcharts of example processes for selecting interactable objects using cone casting with a dynamically adjustable aperture.

FIG. 13 is a flowchart of an example process for selecting objects using cone casting with dynamically adjustable aperture. This process 1300 can be performed by the wearable system (shown in FIGS. 2 and 4).

At block 1310, the wearable system can initiate a cone cast. The cone cast can be triggered by a user's pose or hand gestures on a user input device. For example, the cone cast may be triggered by a click on the user input device and/or by the user looking in a direction for an extended period of time. As shown in block 1320, the wearable system can analyze salient features of the user's environment, such as, e.g., type of the objects, layout of the objects (physical or virtual), location of the objects, size of the objects, density of the objects, distance between the objects and the user, etc. For example, the wearable system can calculate the density of the objects in the user's direction of gaze by determining the number of objects and the size of the objects in front of the user. The salient features of the environment may be part of the contextual information described herein.

At block 1330, the wearable system can adjust the size of the aperture based on the contextual information. As discussed with reference to FIGS. 12B and 12C, the wearable system can increase the aperture size when the objects are sparsely located and/or when there is no obstruction. The large aperture size can correspond to a large diameter 1226 on the distal end 1228b of the cone 1220. As the user moves around and/or changes the environment, the wearable system may update the size of the aperture based on the contextual information. The contextual information can be combined with other information such as user's preference, user's pose, characteristics of the cone (such as, e.g., depth, color, location, etc.) to determine and update the aperture.

The wearable system can render a cone cast visualization at block 1340. The cone cast visualization can include a cone with a non-negligence aperture. As described with reference to FIGS. 12A, 12B, and 12C, the cone may have a variety of size, shape, or color.

At block 1350, the wearable system can translate a cone cast and scan for collision. For example, the wearable system can translate the amount of movement of the cone using the techniques described with reference to FIGS. 16-18. The wearable system can also determine whether the cone has collided with one or more objects by calculating the position of the cone with respect to the positions of the objects in the user's environment. As discussed with reference to FIGS. 12A, 12B, and 12C, one or more objects can intersect with the surface of cone or fall within the cone.

If the wearable system does not detect a collision, at block 1360, the wearable system repeats block 1320 where the wearable system analyzes the user's environment and can update the aperture based on the user's environment (as shown in block 1330). If the wearable system detects the collision, the wearable system can indicate the collision, for example, by placing a focus indicator on the collided objects. When the cone collides with multiple interactable objects, the wearable system can use a disambiguation technique to capture one or more occluded objects.

At block 1380, the user can optionally interact with the collided object in various ways as described with reference to FIGS. 12A, 12B, and 12C. For example, the user can select an object, open a menu associated with the object, or move an object, etc.

Figure 14:
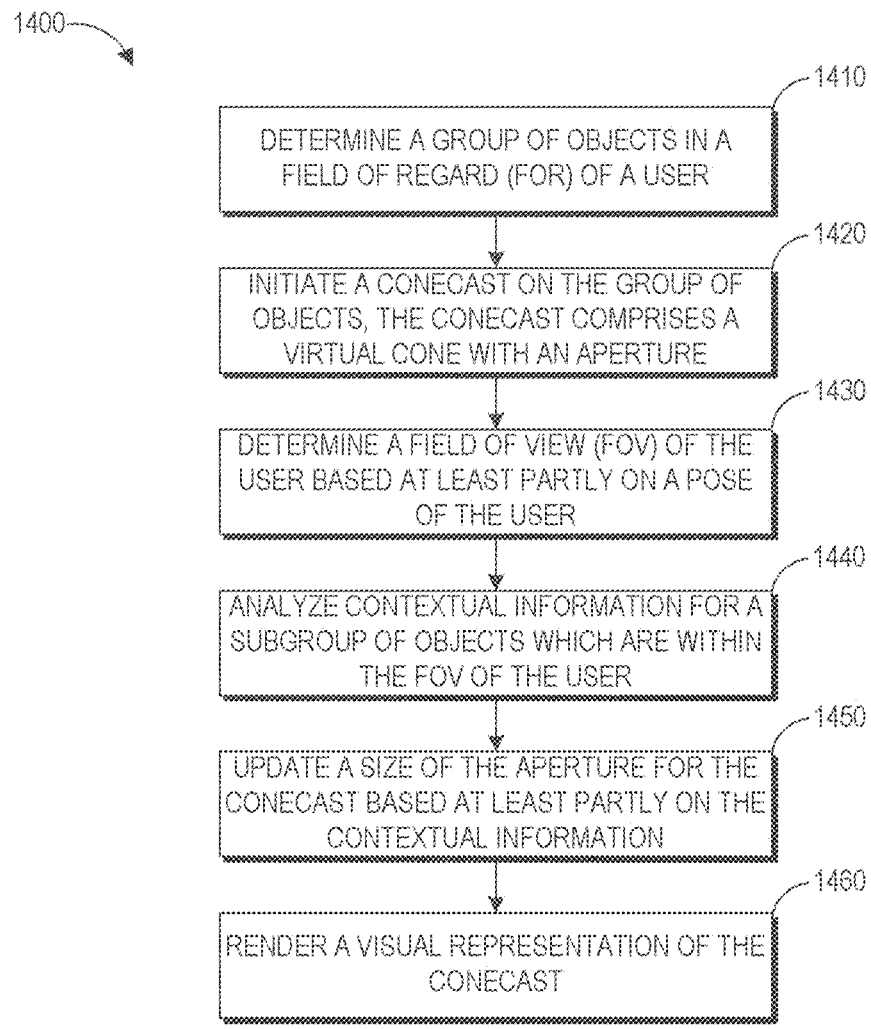

FIG. 14 is another flowchart of an example process for selecting objects using cone casting with dynamically adjustable aperture. This process 1400 can be performed by the wearable system (shown in FIGS. 2 and 4). At block 1410, the wearable system determines a group of objects in the user's FOR.

At block 1420, the wearable system can initiate a cone cast on the group of objects in the user's FOR. The wearable system can initiate the cone cast based on an input from the user input device (for example, a swing of a wand) or a pose (e.g., a certain hand gesture). The wearable system can also automatically trigger a cone cast based on a certain condition. For example, the wearable system may automatically begin the cone cast when the user is at the main display of the wearable system. The cone cast may use a virtual cone which may have a central ray and an aperture transverse to the central ray. The central ray may be based on the user's direction of gaze.

At block 1430, the wearable system can determine the user's pose. The user's pose may be the head, eye, or body pose, alone or in combination. The wearable system can determine the user's FOV based on the user's pose. The FOV can comprise a portion of the FOR that is perceived at a given time by the user.

Based on the user's FOV, at block 1440, the wearable system can determine a subgroup of objects which are within the user's FOV. As the user's FOV changes, the objects within the user's FOV may also change. The wearable system can be configured to analyze the contextual information of the objects in the user's FOV. For example, the wearable system may determine the density of the objects based on the object's size and location in the FOV.

At block 1450, the wearable system can determine a size of the aperture for the cone cast event. The size of the aperture may be determined based on contextual information. For example, when the wearable system determines that the density of objects is high, the wearable system may use a cone with small aperture to increase precision of user interaction. In some embodiments, the wearable system can also adjust the depth of the cone. For example, when the wearable system determines that all of the objects are located far away from the user, the wearable system may extend the cone to the depth plane having these objects. Similarly, if the wearable system determines that the objects are located close to the user, the wearable system may shrink the depth of the cone.

The wearable system can generate a visual representation of the cone cast at block 1460. The visual representation of the cone can incorporate the properties of the cone as described with reference to FIGS. 12B and 12C. For example, the wearable system can display a virtual cone with a color, shape, and depth. The location of the virtual cone may be associated with the user's head pose, body pose, or direction of gaze. The cone may be a geometric cone, a cuboid, a polyhedron, a pyramid, a frustum, or other three-dimensional shapes which may or may not be regular shapes.

As the user moves around, the cone can also move together with the user. As further described with reference to FIGS. 15-18, as the user moves around, the amount of movement of the cone corresponding to the user's movement can also be calculated based on contextual information. For example, if the density of the objects in the FOV is low, a slight movement of the user can result in a large movement of the cone. On the other hand, if the density is high, that same movement may result in a smaller movement of the cone, which thereby allows for more refined interactions with the objects.

Figure 15:
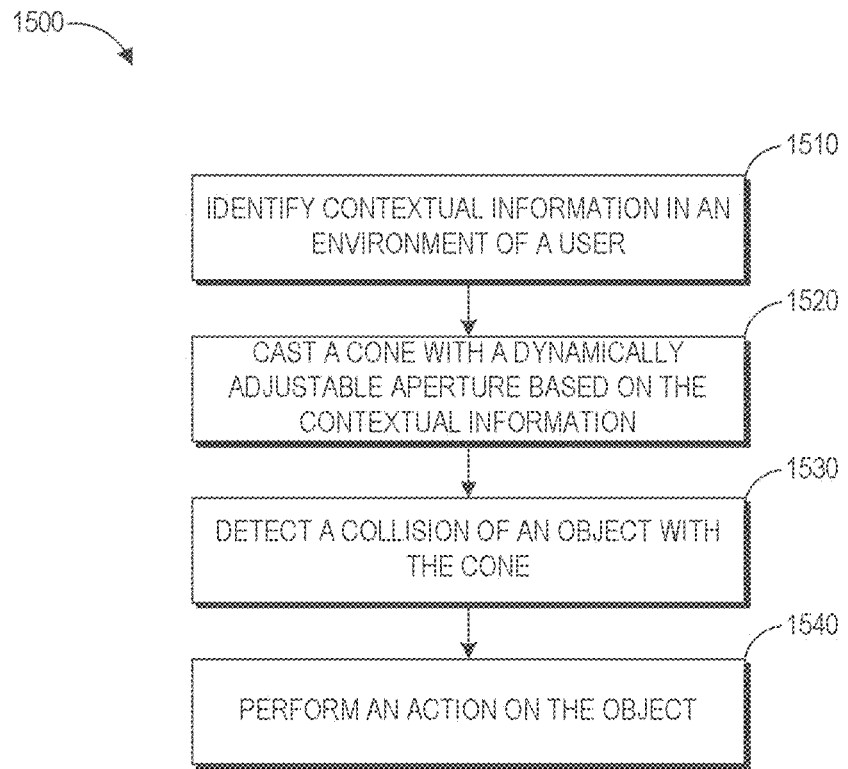

FIG. 15 is an example process 1500 for cone casting with dynamically adjustable aperture. The process 1500 in FIG. 15 can be performed by the wearable system (shown in FIGS. 2 and 4). At block 1510, the wearable system can determine contextual information in a user's environment. The contextual information may include information of the user's environment and/or information associated with objects, such as the layout of objects, density of the objects, distance between the objects to the user, etc.

At block 1520, the wearable system can cast a cone with a dynamically adjustable aperture based on the contextual information. For example, when the density of the objects is low, the aperture may be big.

At block 1530, the wearable system can detect collision between an object and the cone. In some embodiments, the wearable system can detect the collision based on the location of the object and the location of the cone. If at least a portion of the object overlaps with the cone, then a collision is detected. In some embodiments, the cone may collide with multiple objects. The wearable system can apply disambiguation techniques to capture one or more occluded objects. As a result, the wearable system can detect collision between the cone and the occluded objects.

Upon detection of collision, the wearable system may assign a focus indicator to the objects that collide with the cone. The wearable system can also provide user interface options such as selecting an object from the collided objects. At block 1540, the wearable system can be configured to receive user interactions with the collided object. For example, the user may move the object, open a menu associated with the object, select the object, etc.

Overview of Translating a Movement Based on Contextual Information

In addition to or in alternative to adjusting the aperture of a cone during a cone cast, the contextual information can also be used to translate a movement associated with a user input device or a portion of a user's body (e.g., a change in a user's pose) to a user interface operation, such as, e.g., moving a virtual object.

A user can move a virtual object or transport a focus indicator by actuating a user input device and/or by using poses such as head, eye, or body pose. As is apparent in an AR/VR/MR world, movement of a virtual object does not refer to actual physical movement of the virtual object, since virtual objects are computer-generated images and not physical objects. Movement of a virtual object refers to the apparent movement of the virtual object as displayed to the user by the AR or VR system.

Figure 16:
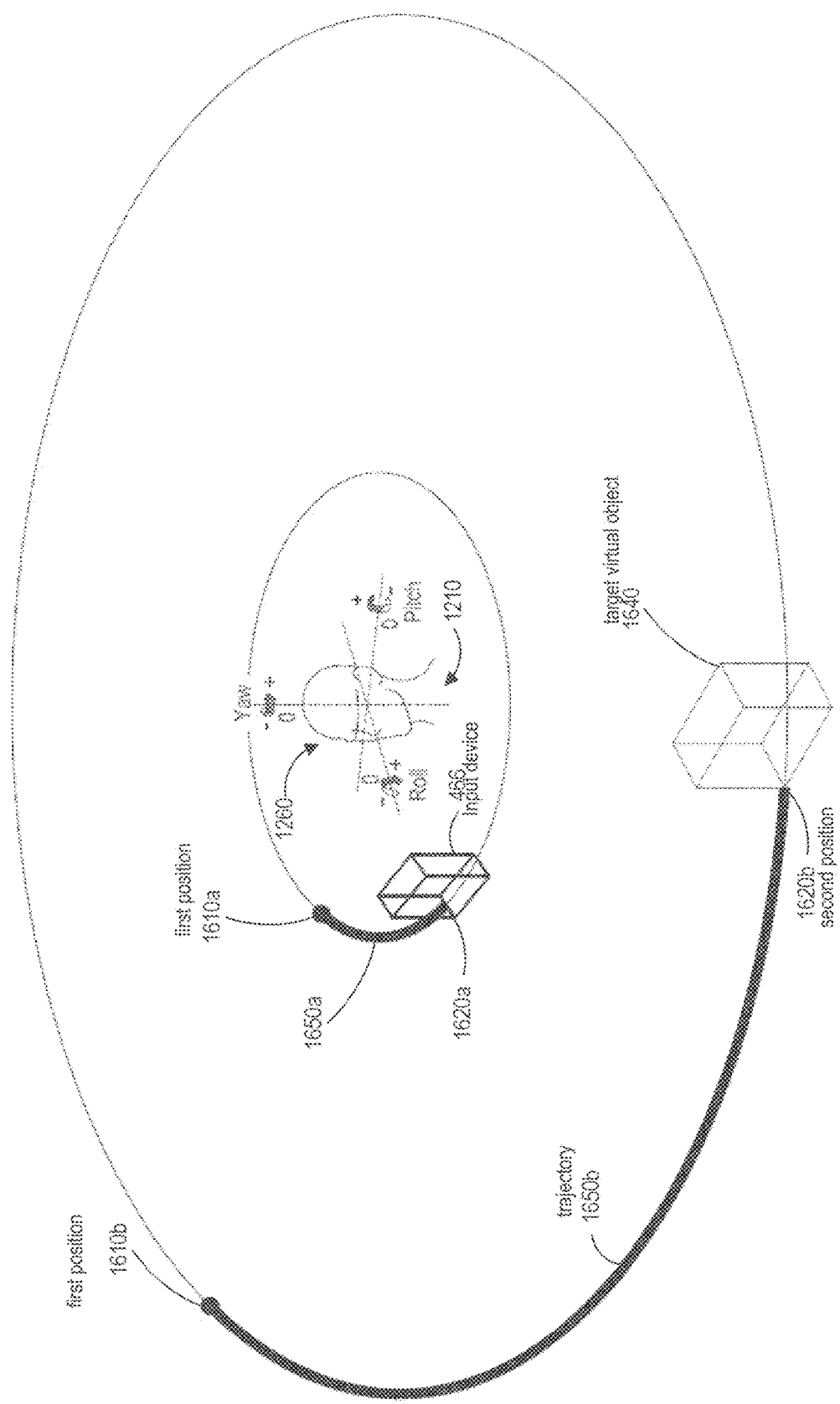
FIG. 16 schematically illustrates an example of moving a virtual object using the user input device.

FIG. 16 schematically illustrates an example of moving a virtual object using a user input device. For example, a user may hold and move a virtual object by selecting the virtual object using the user input device and move the virtual object by physically moving the user input device 466. The user input device 466 may initially be at a first position 1610*a*. The user 1210 may select a target virtual object 1640 located at a first position 1610*b* by actuating the user input device 466 (e.g., by actuating a touch sensitive pad on the device). The target virtual object 1640 can be any type of virtual object that can be displayed and moved by the wearable system. For example, the virtual object may be an avatar, a user interface element (e.g., a virtual display), or any type of graphical element displayed by the wearable system (such as, e.g. a focus indicator). The user 1210 can move the target virtual object from the first position 1610*b* to a second position 1620*b* by moving the user input device 466 along a trajectory 1650*b*. However, because the target virtual object may be far away from the user, the user may need to move the user input device by a large distance before the target virtual object reaches its desired location, which can cause the user to use large hand and arm movements and ultimately lead to fatigue of the user.

Embodiments of the wearable system may provide techniques for moving distant virtual objects rapidly and efficiently by moving the virtual object by an amount based on the movement of the controller and a multiplier that tends to increase with the distance to the virtual object. Such embodiments may advantageously permit the user to move distant virtual objects using shorter hand and arm movements, thereby mitigating user fatigue.

The wearable system can calculate a multiplier for mapping movement of the user input device to the movement of the target virtual object. The movement of the target virtual object may be based on the movement of the input controller and the multiplier. For example, the amount of movements of the target virtual object may be equal to the amount of movements of the input controller multiplied by the multiplier. This may reduce the amount the user needs to move before the target virtual object reaches the desired location. For example, as shown in FIG. 16, the wearable system may determine a multiplier which allows the user to move the user input device along the trajectory 1650*a* (which is shorter than the trajectory 1650*b*) in order to move the virtual object from position 1620*b* to position 1610*b*.

Additionally or alternatively, the user 1210 can move a virtual object using head poses. For example, as shown in FIG. 16, a head may have multiple degrees of freedom. As the head moves toward different directions, the head pose will change relative to the natural resting direction 1260. The example coordinate system in FIG. 16 shows three angular degrees of freedom (e.g., yaw, pitch, and roll) that can be used for measuring the head pose relative to the natural resting state 1260 of the head. As illustrated in FIG. 16, the head can tilt forward and backward (e.g. pitching), turning left and right (e.g. yawing), and tilting side to side (e.g. rolling). In other implementations, other techniques or angular representations for measuring head pose can be used, for example, any other type of Euler angle system. The wearable system (see e.g. the wearable system 200 in FIG. 2 and the wearable system 400 in FIG. 4) as discussed herein may be used to determine the user's head pose, e.g., using accelerometers, inertial measurement units, etc. The wearable system may also move the virtual objects based on eye pose (e.g., as measured by an eye-tracking camera) and head pose. For example, the user may select a virtual object by gazing at an object for an extended period of time and move the selected object using head pose. The techniques for mapping the movement of user input device described herein can also be applied to changes in the user's head, eye, and/or body pose, namely, that the amount of movement of a virtual object is a multiplier times the amount of physical movement of the user's body (e.g., eye, head, hands, etc.).

Examples of Multipliers Based on Distance

As described above, the wearable system can calculate a multiplier for mapping the movement of the user input device to the movement of the target virtual object. The multiplier may be calculated based on contextual information such as, e.g., the distance between the user and the target virtual object. For example, as shown in FIG. 16, the multiplier may be calculated using the distance between the position of the head of the user 1210 and position of the virtual object 1640.

Figure 17:
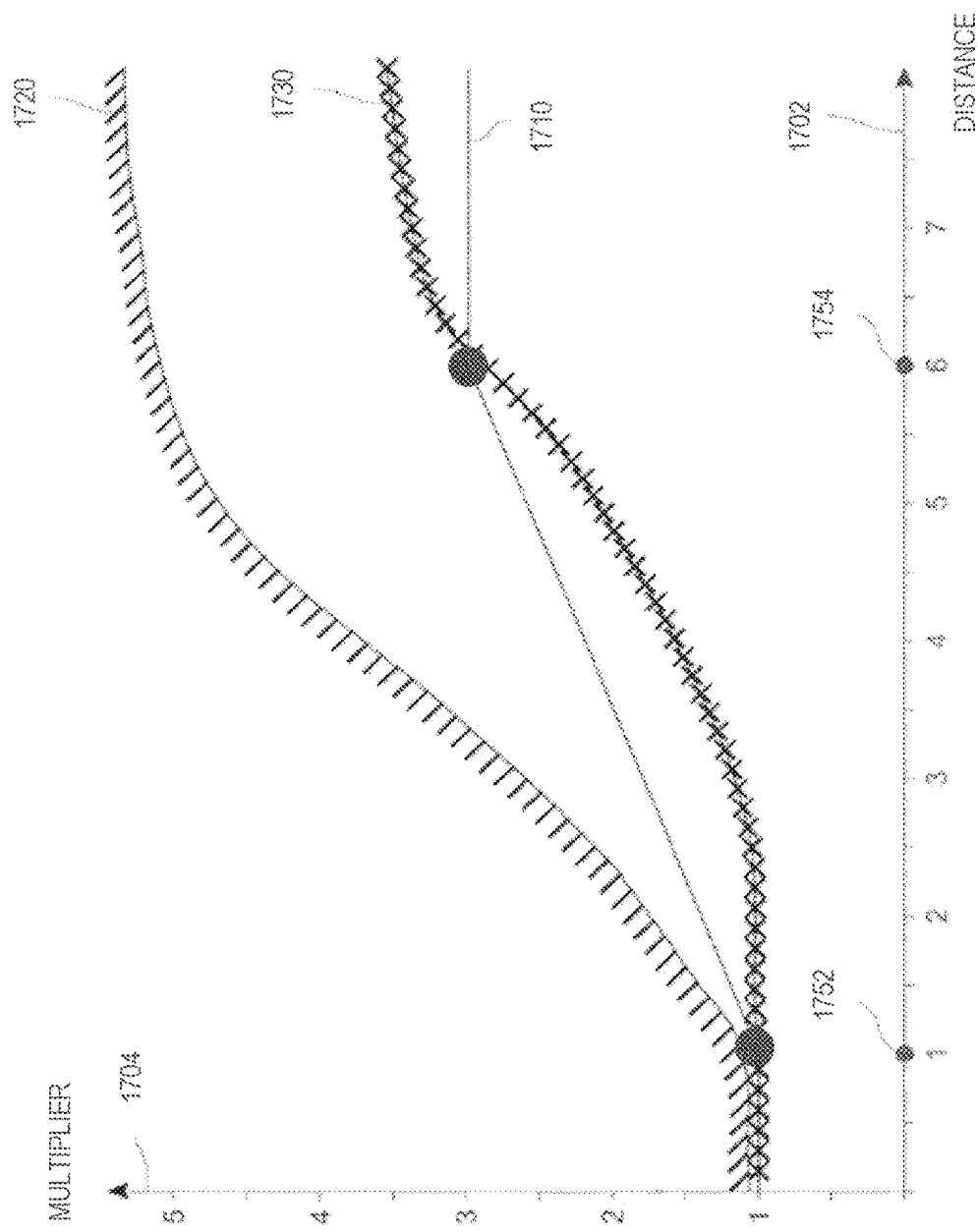
FIG. 17 schematically illustrates examples of a multiplier as a function of distance.

FIG. 17 schematically illustrates examples of a multiplier as a function of distance. As shown in FIG. 17, the axis 1704 shows the magnitude of the multiplier. The axis 1702 illustrates various distances (e.g., in feet or meters) between two end points. The end points may be determined in a variety of ways. For example, one end point may be the position of the user (e.g., measured from the ARD of the user) or the location of the user input device. The other end point may be the position of the target virtual object.

The distance between the user and the virtual object may change as end points for calculating the distance change. For example, the user and/or the virtual object may move around. The user 1210 may actuate the user input device to pull a virtual object closer. During this process, the multiplier may change based on various factors described herein. For example, the multiplier may decrease as the virtual object gets closer to the user or increase as the virtual object gets farther from the user.

Curves 1710, 1720, and 1730 illustrate examples of relationships between the multiplier and the distance. As shown by the curve 1710, the multiplier may equal one when the distance is less than a threshold 1752. The curve 1710 shows a linear relationship between the distance and the multiplier in-between the threshold 1752 and the threshold 1754. As described with reference to FIG. 16, this proportional linear relationship may cause the wearable system to map a small change in position of the user input device to a large change in position for an object located farther away (up to the threshold 1754). The curve 1710 reaches its maximum at a threshold 1754, and therefore any further increase in distance will not change the magnitude of the multiplier. This may prevent very distant virtual objects from moving extremely large distances in response to small movements of the user input device.

The thresholding of the multiplier in the curve 1710 is optional (at either or both thresholds 1752, 1754). The wearable system may generate the multiplier using no thresholds or multiple thresholds.

To allow for more precise one-to-one manipulation, one example threshold may be the user's hand reach. The user's hand reach may be an adjustable parameter that can be set by the user or the HMD (to account for users with different reaches). The user's hand reach may be in a range from about 10 cm to about 1.5 m in various implementations. With reference to FIG. 16, for example, if the target virtual object is within the hand reach, then, as the user 1210 moves the user input device 466 along trajectory 1650a from position 1610a to position 1620a, the target virtual object may also move along trajectory 1650a. If the target virtual object 1640 is farther than the hand reach, the multiplier may increase. For example, in FIG. 16, if the target virtual object 1640 is initially at position 1610b, as the user input device 466 moves from position 1610a to position 1620a, the target virtual object 1640 can move from position 1610b to position 1620b, and thereby moving a greater amount of distance than that of the user input device 466.

The relationship between the distance and the multiplier is not limited to a linear relationship; rather it may be determined based on a variety of algorithms and/or factors. For example, as shown in FIG. 17, the curve 1720 may be generated using one or more power law functions between distance and multiplier, e.g., where the multiplier is proportional to distance raised to a power. The power may be 0.5, 1.5, 2. Similarly, the curve 1730 may be generated based on user preference where the multiplier is equal to one when the object is within a user-adjustable threshold distance.

As an example, the movement of the virtual object (e.g., an angular movement) may be represented by a variable, delta_object, and the movement of the user input device may be represented by a variable, delta_input. The deltas are related by the multiplier:

$$\text{delta\_object} = \text{multiplier}(d) * \text{delta\_input}. \tag{1}$$

Sensors in the user input device or the outward facing camera of the ARD may be used to measure delta_input. The multiplier as a function of distance d can be determined from a look-up table, a functional form (e.g., power law), or a curve (see, e.g., the examples in FIG. 17). In some implementations, the distance may be normalized by the distance from the user to the input device. For example, the distance d may be determined as:

$$d = \frac{\text{distance from camera to object}}{\text{distance from camera to input device}}. \tag{2}$$

In Equation (2), the normalized distance is dimensionless and equal to one if the object is at the distance of the input device. As discussed above, the multiplier may be set to one for objects within hand reach (e.g., within the distance from the camera to the input device). Accordingly, Equation (2) permits the wearable system to dynamically adjust the hand's length distance based on where the user is holding the input device. An example power-law multiplier can be:

$$\text{multiplier}(d) = \begin{cases} d^p, & d \geq 1 \\ 1, & d < 1 \end{cases}, \tag{3}$$

where the power p is, for example, 1 (linear), 2 (quadratic), or any other integer or real number.

Other Example Multipliers

The multiplier can also be calculated using other factors such as contextual information about the user's physical and/or virtual environment. For example, if the virtual object is located in a dense cluster of objects, the wearable system may use a smaller multiplier and increase precision of placing the object. The contextual information may also include properties of the virtual object. For example, in a driving game, the wearable system may provide a large multiplier for a good car and a small multiplier for a mediocre car.

Multipliers may depend on the direction of movements. For example, in the x-y-z coordinate shown in FIG. 6, the multiplier for x-axis may be different from the multiplier for z-axis. With reference to FIG. 16, instead of moving the virtual object 1640 from 1610b to 1620b, the user 1210 may want to pull the virtual object 1640 closer to himself. In this situation, the wearable system may use a multiplier that is smaller than the multiplier for moving the virtual object 1640 from 1610b to 1620b. This way, the virtual object 1640 may not suddenly appear to be very close to the user.

The wearable system can allow the user to configure the multiplier. For example, the wearable system may give the user several options for choosing a multiplier. A user preferring slow movements can choose the multiplier with a small magnitude. The user may also provide certain factors and/or the importance of the factors which the wearable system will use to automatically determine the multiplier. For example, the user can set a weight of the distance to be higher than the weight associated with the properties of the virtual objects. Accordingly, the distance will have a larger impact on the magnitude of the multiplier than the properties of the virtual objects. Further, as described with reference to FIG. 17, a multiplier may have one or more thresholds. One or more of the thresholds may be calculated based on values of a set of factors (such as factors determined from contextual information). In certain embodiments, one threshold may be calculated based on one set of factors while another threshold may be calculated based on another set of factors (which may not be overlapping with the first set of factors).

Example Applications of Multipliers

As described with reference to FIGS. 16 and 17, the wearable system can apply a multiplier for mapping the movements of the user input device to the movements of a virtual object. The movements may include speed, acceleration, or position change (such as rotation, movement from one location to the other). For example, the wearable system may be configured to move a virtual object faster when the virtual object is located farther away.

As another example, the multiplier may also be used to determine the acceleration of the virtual object. When the virtual object is far away from the user, the virtual object may have a large initial acceleration when the user actuates the user input device to move the virtual object. In some embodiments, the multiplier for acceleration may peak or decrease after a certain threshold. For example, to avoid moving the object too fast, the wearable system may decrease the multiplier for acceleration when the virtual object reaches the midpoint of a trajectory or when the speed of the virtual object reaches a threshold.

In some implementations, the wearable system may use a focus indicator to show current position of the user input device and/or a user's pose (e.g. head, body, eye pose). The multiplier may be applied to indicate the position change of the focus indicator. For example, the wearable system may show a virtual cone during a cone cast (see descriptions of cone casting in FIGS. 12-15). When the depth of the cone is set at a distant location, the wearable system may apply large multiplier. Accordingly, as the user moves around, the virtual cone may move a great amount of distance.

Additionally or alternatively, the wearable system can map the movements of the user input device to the movements of multiple virtual objects. For example, in a virtual game, the player can move a group of virtual soldiers together by actuating the user input device. The wearable system can translate the movements of the user input device to the movements of the group of virtual soldiers by applying the multiplier to the group of virtual soldiers together and/or by applying the multiplier to each of the virtual soldiers in the group.

Example Processes of Moving a Virtual Object

Figure 18:
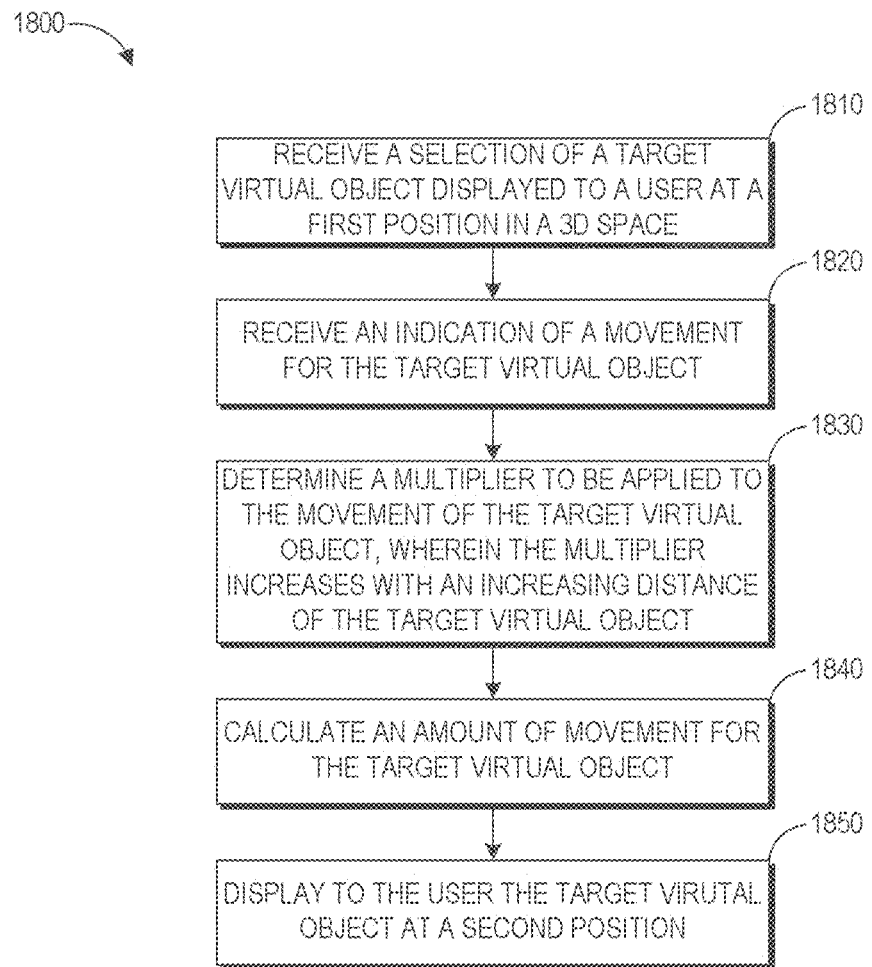
FIG. 18 illustrates a flowchart of an example process for moving a virtual object in response to movements of the user input device.

FIG. 18 illustrates a flowchart of an example process for moving a virtual object in response to movements of the user input device. The process 1800 can be performed by the wearable system shown in FIGS. 2 and 4.

At block 1810, the wearable system receives a selection of a target virtual object. The virtual object may be displayed by the wearable system at a first position in a 3D space. The user can select the target virtual object by actuating the user input device. Additionally or alternatively, the wearable system can be configured to support a user to move the target virtual object using various body, head, or eye poses. For example, the user may select the target virtual object by pointing his finger at the target virtual object and may move the target virtual object by moving his arm.

At block 1820, the wearable system can receive an indication of a movement for the target virtual object. The wearable system may receive such indication from the user input device. The wearable system may also receive such indication from the sensors (such as, e.g., the outward-facing imaging system 464) which can determine changes in the user's pose. The indication can be a trajectory of movements or changes in a position of a portion of a user's body or the user input device.

At block 1830, the wearable system determines the value of the multiplier that will be applied based on contextual information described herein. For example, the wearable system may calculate a multiplier based on a distance between the object and the user input device, where the multiplier can increase with an increasing distance of the target virtual object (at least over a range of distances from the user input device; see, e.g., the example in Eq. (3)). In some embodiments, the multiplier is a non-decreasing function of distance between the object and the user input device.

As shown in block 1840, this multiplier may be used to calculate the amount of movement for the target virtual object. For example, where the multiplier is calculated using the distance between the object and the user input device, the multiplier might be large for a faraway target virtual object. The wearable system may use Equation (3) to relate the amount of movement of the input device and the multiplier to yield the amount of movement of the target virtual object. The trajectory of the target virtual object's movements may be calculated using other factors together with the multiplier. For example, the wearable system may calculate the trajectory based on the environment of the user. When there is another object along the path of the target virtual object, the wearable system may be configured to move the target virtual object so as to circumvent collision with that other object.

At block 1850, the wearable system can display the movement of the target virtual object based on the calculated trajectory or the multiplier. For example, the wearable system can calculate a second position in the 3D space based on the amount of movement calculated in block 1840. The wearable system can accordingly display the target virtual object at the second position. As discussed with reference to FIG. 16, the wearable system may also be configured display the movement of the visible focus indicator using the multiplier.

Additional Embodiments

In a 1st aspect, method for selecting a virtual object located in three-dimensional (3D) space, the method comprising: under control of an augmented reality (AR) system comprising computer hardware, the AR system configured to permit user interaction with objects in a field of regard (FOR) of a user, the FOR comprising a portion of the environment around the user that is capable of being perceived by the user via the AR system: determining a group of objects in the FOR of the user; determining a pose of the user; initiating a cone cast on the group of objects, the cone cast comprises casting a virtual cone with an aperture in a direction based at least partly on the pose of the user; analyzing contextual information associated with a subgroup of objects within the group of objects; updating the aperture for the cone cast event based at least partly on the contextual information; and rendering a visual representation of the cone cast.

In a 2nd aspect, the method of aspect 1, wherein the subgroup of the objects are within a field of view (FOV) of the user, the FOV comprising a portion of the FOR that is capable of being perceived at a given time by the user via the AR system.

In a 3rd aspect, the method of aspect 1 or 2, wherein the contextual information comprises one or more of the following: a type, a layout, a location, a size, or a density of one or more objects within the subgroup of the objects.

In a 4th aspect, the method of aspect 3, wherein the contextual information further comprises a preference of the user.

In a 5th aspect, the method of any one of aspects 1-4, further comprising detecting collisions between the cone and one or more objects.

In a 6th aspect, the method of aspect 5, wherein the one or more objects comprise an interactable object.

In a 7th aspect, the method of aspect 6, wherein in response to detecting a collision with the interactable object, the method further comprises performing an action on the interactable object.

In an 8th aspect, the method of aspect 7, wherein the action comprises one or more of the following: selecting the interactable object, moving the interactable object, or opening a menu associated with the interactable object.

In a 9th aspect, the method of aspect 5 or 6, further comprising applying an occlusion disambiguation technique to the one or more objects collided with the cone.

In a 10th aspect, the method of any one of aspects 1-9, further comprising updating the aperture of the cone based at least in part on a change in the pose of the user.

In an 11th aspect, the method of any one of aspects 1-10, wherein the cone has a shape.

In a 12th aspect, the method of aspect 11, wherein the shape comprises one or more of: geometric cone, cuboid, polyhedron, pyramid, or frustum.

In a 13th aspect, the method of any one of aspects 1-12, wherein the cone has a central ray.

In a 14th aspect, the method of aspect 13, wherein the central ray is determined at least partly on the pose of the user.

In a 15th aspect, the method of aspect 13 or 14, wherein the aperture is transverse to the central ray.

In a 16th aspect, the method of any one of aspects 1-15, further comprising disambiguating objects that collide with the cone.

In a 17th aspect, an augmented reality system configured to perform the method of any one of aspects 1-16.

In an 18th aspect, a method for translating a virtual object located in three-dimensional (3D) space, the method comprising: under control of an augmented reality (AR) system comprising computer hardware and a user input device, the AR system configured to permit user interaction with virtual objects in a field of regard (FOR) of a user, the FOR comprising a portion of the environment around a user that is capable of being perceived by the user via the AR system, the virtual objects presented for display to the user via the AR system: determining a group of virtual objects in the FOR of the user; receiving a selection of a target virtual object within the group of the virtual objects in the FOR of the user; calculating a distance to the target virtual object; determining a multiplier based at least partly on the distance to the target virtual object; receiving a first movement of the user input device; calculating a second movement of the target virtual object, the second movement based at least partly on the first movement and the multiplier; and moving the target virtual object by an amount based at least partly on the second movement.

In a 19th aspect, the method of aspect 18, wherein calculating the distance to the virtual object comprises calculating a distance between the virtual object and the user input device, a distance between the virtual object and a sensor on the AR system, or a distance between the user input device and a sensor on the AR system.

In a 20th aspect, the method of aspect 18, wherein the second movement equals the first movement multiplied by the multiplier.

In a 21st aspect, the method of aspect 18, wherein the multiplier increases with increasing distance over a first range of distances.

In a 22nd aspect, the method of aspect 21, wherein the multiplier increases linearly with increasing distance over the first range.

In a 23rd aspect, the method of aspect 21, wherein the multiplier increases as a power of the distance over the first range.

In a 24th aspect, the method of aspect 18, wherein the multiplier equals a first threshold when the distance is less than a first distance.

In a 25th aspect, the method of aspect 24, wherein the first distance is equal to a user's hand reach.

In a 26th aspect, the method of aspect 24, wherein the first threshold equals one.

In a 27th aspect, the method of aspect any one of aspects 18-26, wherein the first movement or the second movement comprise a first speed or a second speed, respectively.

In a 28th aspect, the method of aspect any one of aspects 18-26, wherein the first movement and the second movement comprise a first acceleration and a second acceleration, respectively.

In a 29th aspect, the method of any one of aspects 18-28, wherein the AR system comprises a head-mounted display.

In a 30th aspect, the method of any one of aspects 18-29, wherein the target virtual object is interactable.

In a 31st aspect, a method for moving a virtual object located in three-dimensional (3D) space, the method comprising: under control of an augmented reality (AR) system comprising computer hardware and a user input device, the AR system configured to present for display to a user virtual objects in the 3D space: receiving a selection of a target virtual object displayed to the user at a first position in the 3D space; receiving an indication of movement for the target virtual object; determining a multiplier to be applied to movement of the target virtual object; calculating a movement amount for the target virtual object, the movement amount based at least partly on the indication of movement and the multiplier; and displaying, to the user, the target virtual object at a second position, the second position based at least in part on the first position and the movement amount.

In a 32nd aspect, the method of aspect 31, wherein determining a multiplier to be applied to movement of the target virtual object comprises calculating a distance to the target virtual object.

In a 33rd aspect, the method of aspect 32, wherein the distance is between the target virtual object and the user input device, between the target virtual object and a sensor on the AR system, or between the user input device and a sensor on the AR system.

In a 34th aspect, the method of aspect 32, wherein the multiplier increases when the distance increases.

In a 35th aspect, the method of any one of aspects 31-34, wherein the multiplier is at least partly based on user's preference.

In a 36th aspect, the method of any one of aspects 31-35, wherein the movement comprises one or more of the following: position change, speed, or acceleration.

In a 37th aspect, the method of any one of aspects 31-36, wherein the target virtual object comprises a group of virtual objects.

In a 38th aspect, the method of aspect any one of aspects 31-37, wherein the target virtual object is interactable.

In a 39th aspect, the method of any one of aspects 31-38, wherein receiving an indication of movement comprises receiving indication of movements from a user input device.

In a 40th aspect, the method of any one of aspects 31-38, wherein receiving an indication of movement comprises receiving indication of a change in the user's pose.

In a 41st aspect, the method of aspect 40, wherein the pose of the user comprises one or more of the following: a head pose, an eye pose, or a body pose.

In a 42nd aspect, an augmented reality system (AR) for translating a virtual object located in three-dimensional (3D) space, the system comprising: a display system; a user input device; computer processors configured to communicate with the display system and the user input device to: determine a group of virtual objects in the FOR of the user; receive a selection of a target virtual object within the group of the virtual objects in the FOR of the user; calculate a distance to the target virtual object; determine a multiplier based at least partly on the distance to the target virtual object; receive a first movement of the user input device; calculate a second movement of the target virtual object, the second movement based at least partly on the first movement and the multiplier; and move the target virtual object by an amount based at least partly on the second movement.

In a 43rd aspect, the system of aspect 42, wherein calculate the distance to the target virtual object comprises calculate a distance between the target virtual object and the user input device, a distance between the virtual object and a sensor on the AR system, or a distance between the user input device and a sensor on the AR system.

In a 44th aspect, the system of aspect 42, wherein the second movement equals the first movement multiplied by the multiplier.

In a 45th aspect, the system of aspect 42, wherein the multiplier increases with increasing distance over a first range of distances.

In a 46th aspect, the system of aspect 45, wherein the multiplier increases linearly with increasing distance over the first range.

In a 47th aspect, the system of aspect 45, wherein the multiplier increases as a power of the distance over the first range.

In a 48th aspect, the system of aspect 42, wherein the multiplier equals a first threshold when the distance is less than a first distance.

In a 49th aspect, the system of aspect 48, wherein the first distance is equal to a user's hand reach.

In a 50th aspect, the system of aspect 48, wherein the first threshold equals one.

In a 51st aspect, the system of aspect any one of aspects 42-50, wherein the first movement or the second movement comprise a first speed or a second speed, respectively.

In a 52nd aspect, the system of aspect any one of aspects 42-50, wherein the first movement and the second movement comprise a first acceleration and a second acceleration, respectively.

In a 53rd aspect, the system of any one of aspects 42-52, wherein the AR system comprises a head-mounted display.

In a 54th aspect, the system of any one of aspects 42-53, wherein the target virtual object is interactable.

In a 55th aspect, an augmented reality system (AR) for moving a virtual object located in three-dimensional (3D) space, the system comprising: a display system; a user input device; computer processors configured to communicate with the display system and the user input device to: receive a selection of a target virtual object displayed to the user at a first position in the 3D space; receive an indication of movement for the target virtual object; determine a multiplier to be applied to movement of the target virtual object; calculate a movement amount for the target virtual object, the movement amount based at least partly on the indication of movement and the multiplier; and display, to the user, the target virtual object at a second position, the second position based at least in part on the first position and the movement amount.

In a 56th aspect, the system of aspect 55, wherein determine a multiplier to be applied to movement of the target virtual object comprises calculate a distance to the target virtual object.

In a 57th aspect, the system of aspect 56, wherein the distance is between the virtual object and the user input device, between the virtual object and a sensor on the AR system, or between the user input device and a sensor on the AR system.

In a 58th aspect, the system of aspect 56, wherein the multiplier increases when the distance increases.

In a 59th aspect, the system of any one of aspects 55-58, wherein the multiplier is at least partly based on user's preference.

In a 60th aspect, the system of any one of aspects 55-59, wherein the movement comprises one or more of the following: position change, speed, or acceleration.

In a 61st aspect, the system of any one of aspects 55-60, wherein the target virtual object comprises a group of virtual objects.

In a 62nd aspect, the system of aspect any one of aspects 55-61, wherein the target virtual object is interactable.

In a 63rd aspect, the system of any one of aspects 55-62, wherein receiving an indication of movement comprises receiving indication of movements from a user input device.

In a 64th aspect, the system of any one of aspects 55-63, wherein receiving an indication of movement comprises receiving indication of a change in the user's pose.

In a 65th aspect, the system of aspect 64, wherein the pose of the user comprises one or more of the following: a head pose, an eye pose, or a body pose.

In a 66th aspect, a system for interacting with objects for a wearable device, the system comprising: display system of a wearable device configured to present a three-dimensional (3D) view to a user and permit a user interaction with objects in a field of regard (FOR) of a user, the FOR comprising a portion of the environment around the user that is capable of being perceived by the user via the display system; a sensor configured to acquire data associated with a pose of the user; a hardware processor in communication with the sensor and the display system, the hardware processor programmed to: determine a pose of the user based on the data acquired by the sensor; initiate a cone cast on a group of objects in the FOR, the cone cast comprises casting a virtual cone with an aperture in a direction based at least partly on the pose of the user; analyze contextual information associated with the user's environment; update the aperture of the virtual cone based at least partly on the contextual information; and render a visual representation of the virtual cone for the cone cast.

In a 67th aspect, the system of aspect 66, wherein the contextual information comprises at least one of: a type, a layout, a location, a size, or a density of a subgroup of objects within the field of view (FOV) of the user, wherein the FOV comprises a portion of the FOR that is capable of being perceived at a given time by the user via the display system.

In a 68th aspect, the system of aspect 67, wherein the density of the subgroup of objects within the FOV of the user is calculated by at least one of: calculating a number of objects in the subgroup of objects; calculating a percentage of the FOV that is covered by the subgroup of objects; or calculating a contour map for objects in the subgroup of objects.

In a 69th aspect, the system of any one of aspects 66-68, wherein the hardware processor is further programmed to detect a collision between the virtual cone and one or more objects within the group of objects in the FOR, and wherein in response to detecting the collision, the hardware processor is further programmed to present a focus indicator to the one or more objects.

In a 70th aspect, the system of aspect 69, wherein the hardware processor is programmed to apply an occlusion disambiguation technique to the one or more objects collided with the virtual cone to identify an occluded object.

In a 71st aspect, the system of any one of aspects 66-70, wherein the cone comprises a central ray and wherein the aperture is transverse to the central ray.

In a 72nd aspect, the system of any one of aspects 66-71, wherein the virtual cone comprises a proximal end and wherein the proximal end is anchored to at least one of the following locations: a location in-between the user's eyes, a location on a portion of a user's arm, a location on a user input device, or any other location in the environment of the user.

In a 73rd aspect, the system of any one of aspects 66-72, wherein the hardware processor is further programmed to receive an indication from a user input device anchoring a depth of the virtual cone to a depth plane and wherein cone cast is performed on the group of objects within the depth plane.

In a 74th aspect, the system of any one of aspects 66-73, wherein the sensor comprises at least one of: an inertial measurement unit or an outward-facing imaging system.

In a 75$^{th}$ aspect, the system of any one of aspects 66-74, wherein the virtual cone comprises at least one of: a geometric cone, a cuboid, a polyhedron, a pyramid, or a frustum.

In a 76th aspect, a method for interacting with objects for a wearable device, the method comprising: receiving a selection of a target virtual object displayed to a user at a first position in a three-dimensional (3D) space; receiving an indication of a movement for the target virtual object; analyzing contextual information associated with the target virtual object; calculating a multiplier to be applied to a movement of the target virtual object based at least partly on the contextual information; calculating a movement amount for the target virtual object, the movement amount based at least partly on the indication of the movement and the multiplier; and displaying, to the user, the target virtual object at a second position, the second position based at least in part on the first position and the movement amount.

In a 77th aspect, the method of aspect 76, wherein the contextual information comprises a distance from the user to the target virtual object.

In a 78th aspect, the method of aspect 77, wherein the multiplier increases proportionally with an increase in the distance.

In a 79th aspect, the method of any one of aspects 76-78, wherein the movement comprises one or more of: a position change, a speed, or an acceleration.

In an 80th aspect, the method of any one of aspects 76-79, wherein the indication of the movement comprises at least one of: an actuation of a user input device associated with the wearable device or a change in a pose of the user.

In an 81st aspect, the method of aspect 80, wherein the pose comprises one or more of: a head pose, an eye pose, or a body pose.

In an 82nd aspect, a system for interacting with objects for a wearable device, the system comprising: a display system of a wearable device configured to present a three-dimensional (3D) view of to a user, the 3D view comprising a target virtual object; a hardware processor in communication with the display system, the hardware processor programmed to: receive an indication of a movement for the target virtual object; analyze contextual information associated with the target virtual object; calculate a multiplier to be applied to a movement of the target virtual object based at least partly on the contextual information; calculate a movement amount for the target virtual object, the movement amount based at least partly on the indication of the movement and the multiplier; and display, by the display system, the target virtual object at a second position, the second position based at least in part on the first position and the movement amount.

In an 83rd aspect, the system of aspect 82, wherein the indication of the movement of the target virtual object comprises a change in a pose of a user of the wearable device or an input received from a user input device associated with the wearable device.

In an 84th aspect, the system of any one of aspects 82-83, wherein the contextual information comprises a distance from the user to the target virtual object.

In an 85th aspect, the system of any one of aspects 82-84, wherein the multiplier equals to one when the distance is less than a threshold distance, wherein the threshold distance equals to a hand reach of the user.

In an 86th aspect, the system of any one of aspects 82-85, wherein the multiplier increases proportionally with an increase in the distance.

In an 87th aspect, the system of any one of aspects 82-86, wherein the movement comprises one or more of: a position change, a speed, or an acceleration.

CONCLUSION

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A system comprising:
   a display system of a wearable device configured to present a three-dimensional (3D) view to a user and permit a user interaction with virtual objects in a field of regard (FOR) of a user, the FOR comprising a portion of an environment around the user that is capable of being perceived by the user via the display system;
   a sensor configured to acquire data associated with a pose of the user;
   a user interface configured to allow a user to select one or more virtual objects in the FOR;
   a hardware processor in communication with the display system, the sensor, and the user interface, the hardware processor programmed to:
   determine the pose of the user based on the data acquired by the sensor;
   initiate a cone on a group of virtual objects in the FOR, the cone having an aperture based at least partly on the pose of the user; determine a display state associated with a virtual object;

based at least in part on the determined display state of the virtual object, determine a visual representation of the cone;

cause the display system to render the determined visual representation of the cone.

2. The system as defined in claim 1, wherein the determined state of the virtual object is a hover state, wherein the virtual object is movable or selectable.

3. The system as defined in claim 1, wherein the determined state of the virtual object is a resting state.

4. The system as defined in claim 1, wherein the visual representation of the cone is determined based in part on a detected change in state of the virtual object.

5. The system as defined in claim 1, wherein the visual representation of the cone is changed from visible to hidden based in part on a detected change in state of the virtual object from a hover state to a selected state.

6. The system as defined in claim 1, wherein the visual representation of the cone is determined based in part on a detected change in state of the virtual object from a hover state to a selected state.

7. The system as defined in claim 1, wherein the determined visual representation of the cone comprises a determined visual representation of an aperture of the cone, a surface of the cone, or a central ray of the cone.

8. The system as defined in claim 1, wherein the determined visual representation of the cone comprises a determined visual representation of an aperture of the cone, the aperture having a minimum size of a single ray.

9. The system as defined in claim 1, wherein the determined visual representation of the cone comprises the determined visual representation of a portion of the cone that interacts with the virtual object.

10. The system as defined in claim 1, wherein the system is configured to increase contrast between the cone and one or more objects in environment.

11. A method for determining a visual representation of a cone, the method comprising:

under control of an AR system comprising a pose sensor and a display system of a wearable device configured to present a three-dimensional (3D) view to a user and permit a user interaction with virtual objects in a field of regard (FOR) of a user, the FOR comprising a portion of an environment around the user that is capable of being perceived by the user via the display system;

determining the pose of the user based on data acquired by the pose sensor;

initiating a cone on one or more virtual objects in the FOR, the cone having an aperture based at least partly on the pose of the user; determining a display state associated with a virtual object;

based at least in part on the determined display state of the virtual object, determining a visual representation of the cone; and causing the display system to render the determined visual representation of the cone.

12. The method as defined in claim 11, wherein the determined state of the virtual object is a hover state, wherein the virtual object is movable or selectable.

13. The method as defined in claim 11, wherein the determined state of the virtual object is a resting state.

14. The method as defined in claim 11, wherein the visual representation of the cone is determined based in part on a detected change in state of the virtual object.

15. The method as defined in claim 11, wherein the visual representation of the cone is changed from visible to hidden based in part on a detected change in state of the virtual object from a hover state to a selected state.

16. The method as defined in claim 11, wherein the visual representation of the cone is determined based in part on a detected change in state of the virtual object from a hover state to a selected state.

17. The method as defined in claim 11, wherein the determined visual representation of the cone comprises a determined visual representation of an aperture of the cone, a surface of the cone, or a central ray of the cone.

18. The method as defined in claim 11, wherein the determined visual representation of the cone comprises a determined visual representation of an aperture of the cone, the aperture having a minimum size of a single ray.

19. The method as defined in claim 11, wherein the determined visual representation of the cone comprises the determined visual representation of a portion of the cone that interacts with the virtual object.

20. The method as defined in claim 11, the method further comprising increasing contrast between the cone and one or more objects in the environment.

* * * * *